United States Patent
Ito et al.

(10) Patent No.: US 11,177,493 B2
(45) Date of Patent: Nov. 16, 2021

(54) FUEL CELL SYSTEM AND VEHICLE

(71) Applicant: TOYOTA JIDOSHA KABUSHIKI KAISHA, Toyota (JP)

(72) Inventors: Masayuki Ito, Sunto-gun (JP); Yasushi Araki, Gotemba (JP); Tomohiko Kaneko, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 125 days.

(21) Appl. No.: 16/676,933

(22) Filed: Nov. 7, 2019

(65) Prior Publication Data

US 2020/0185744 A1 Jun. 11, 2020

(30) Foreign Application Priority Data

Dec. 11, 2018 (JP) .............................. JP2018-231880

(51) Int. Cl.

| | |
|---|---|
| *H01M 8/04746* | (2016.01) |
| *H01M 16/00* | (2006.01) |
| *H01M 8/241* | (2016.01) |
| *H01M 8/04537* | (2016.01) |
| *B60L 50/72* | (2019.01) |

(Continued)

(52) U.S. Cl.
CPC ......... *H01M 8/04753* (2013.01); *B60L 50/72* (2019.02); *H01M 8/04611* (2013.01); *H01M 8/04873* (2013.01); *H01M 8/241* (2013.01); *H01M 16/006* (2013.01); *H01M 2008/1095* (2013.01); *H01M 2220/20* (2013.01); *H01M 2250/20* (2013.01)

(58) Field of Classification Search
CPC .......... B60L 50/70; B60L 50/72; B60L 58/30; H01M 16/006; H01M 2008/1095; H01M 2220/20; H01M 2250/20; H01M 8/04097; H01M 8/04223; H01M 8/04611; H01M 8/04753; H01M 8/04873; H01M 8/0488; H01M 8/0494; H01M 8/241; H01M 8/249
See application file for complete search history.

(56) References Cited

U.S. PATENT DOCUMENTS

| | | | |
|---|---|---|---|
| 2002/0177018 A1* | 11/2002 | Fuglevand | H01M 8/04589 429/432 |
| 2016/0141905 A1* | 5/2016 | Yamanaka | B60L 50/52 320/135 |
| 2020/0044270 A1* | 2/2020 | Nakajima | H01M 8/0491 |

FOREIGN PATENT DOCUMENTS

| | | |
|---|---|---|
| JP | 62-150664 | 7/1987 |
| JP | 2006-179242 | 7/2006 |

(Continued)

*Primary Examiner* — Adam A Arciero
(74) *Attorney, Agent, or Firm* — Finnegan, Henderson, Farabow, Garrett & Dunner, LLP

(57) ABSTRACT

A fuel cell system is equipped with a fuel cell unit that is composed of a plurality of fuel cells including a first fuel cell and a second fuel cell, a first supply device and a second supply device that supply reactive gas to the first fuel cell and the second fuel cell respectively, and a control device that controls running of the first fuel cell and the second fuel cell and operation of the first supply device and the second supply device. The control device suspends electric power generation by the first fuel cell and drives the first supply device to hold an opening circuit voltage of the first fuel cell within a target range, and suspends electric power generation by the second fuel cell and stops driving the second supply device when an output P required of the fuel cell unit is equal to 0.

12 Claims, 15 Drawing Sheets

(51) Int. Cl.
*H01M 8/04858* (2016.01)
*H01M 8/1018* (2016.01)

(56) References Cited

FOREIGN PATENT DOCUMENTS

| | | | | |
|---|---|---|---|---|
| JP | 2010-055927 | 3/2010 | | |
| JP | 2016-096086 | 5/2016 | | |
| WO | WO-2018163964 A1 * | 9/2018 | .......... | H01M 8/0488 |

* cited by examiner

FOURTH EMBODIMENT

SIXTH EMBODIMENT

TL<TP≤TH

TP≤TL

SEVENTH EMBODIMENT

TL<TP≤TH

TP≤TL

SECOND MODIFICATION EXAMPLE

THIRD MODIFICATION EXAMPLE

FUEL CELL SYSTEM AND VEHICLE

INCORPORATION BY REFERENCE

The disclosure of Japanese Patent Application No. 2018-231880 filed on Dec. 11, 2018 including the specification, drawings and abstract is incorporated herein by reference in its entirety.

BACKGROUND

1. Technical Field

The disclosure relates to a fuel cell system and a vehicle.

2. Description of Related Art

In the case where the output required of a fuel cell is equal to zero or the output required of a fuel cell system including a fuel cell is low, electric power generation by the fuel cell is suspended. When the required output increases, electric power generation by the fuel cell is resumed. In order to secure output responsiveness in resuming electric power generation by the fuel cell to this required output, it is known to hold the opening circuit voltage of the fuel cell within a target range by adjusting the amount of reactive gas supplied to the fuel cell even in a state where electric power generation is suspended (e.g., see Japanese Patent Application Publication No. 2016-096086 (JP 2016-096086 A)).

SUMMARY

If the opening circuit voltage has been held within the target range for a long time in the state where electric power generation is suspended as described above, the amount of electric power consumed by a supply device that supplies reactive gas to the fuel cell increases.

The disclosure provides a fuel cell system that restrains the amount of electric power consumption from increasing while ensuring responsiveness to the required output.

An aspect of the disclosure relates to a fuel cell system that is equipped with a fuel cell unit that is composed of a plurality of fuel cells including a first fuel cell and a second fuel cell, a first supply device and a second supply device that supply reactive gas to the first fuel cell and the second fuel cell respectively, and a control device that controls running of the first fuel cell and the second fuel cell and operation of the first supply device and the second supply device. The control device is configured to suspend electric power generation by the first fuel cell and drive the first supply device to hold an opening circuit voltage of the first fuel cell within a target range, and suspend electric power generation by the second fuel cell and stop driving the second supply device when an output P required of the fuel cell unit is equal to 0.

When P is equal to 0, the electric power generation by the first fuel cell is suspended, and the opening circuit voltage thereof is held within the target range, so responsiveness of the output of the first fuel cell in resuming electric power generation can be secured. Besides, the electric power generation by the second fuel cell is suspended, and the driving of the second supply device is stopped, so the amount of electric power consumed by the second supply device to hold the opening circuit voltage of the second fuel cell within the target range can be reduced.

A threshold H may be larger than 0, and the control device may be configured to cause the electric power generation by the first fuel cell and suspend the electric power generation by the second fuel cell when P is larger than 0 and equal to or smaller than H, and cause the electric power generation by the first fuel cell and the second fuel cell when P is larger than H.

The control device may be configured to cause the electric power generation by the first fuel cell and the second fuel cell when P is larger than 0.

A threshold L may be equal to or larger than 0 and smaller than H, and the control device may be configured to drive the second supply device to hold the opening circuit voltage of the second fuel cell within the target range when P is larger than L and equal to or smaller than H.

A threshold L may be larger than 0 and equal to or smaller than H, and the control device may be configured to suspend the electric power generation by the second fuel cell and stop driving the second supply device when P is larger than 0 and equal to or smaller than L.

The fuel cell system may be further equipped with a secondary battery. A threshold TL is smaller than a threshold TH. The control device may be configured to regard P as equal to 0 when a total output TP required of the entire fuel cell system is equal to or smaller than TH, suspend the electric power generation by the first fuel cell and drive the first supply device to hold the opening circuit voltage of the first fuel cell within the target range, and suspend the electric power generation by the second fuel cell and stop driving the second supply device when TP is equal to or smaller than TL, and drive the first supply device to hold the opening circuit voltage of the first fuel cell within the target range and drive the second supply device to hold the opening circuit voltage of the second fuel cell within the target range when TP is larger than TL and equal to or smaller than TH.

A lower limit of the target range of the opening circuit voltage of the first fuel cell may be higher when TP is equal to or smaller than TL than when TP is larger than TL and equal to or smaller than TH.

The target range of the opening circuit voltage of the first fuel cell may be wider when TP is equal to or smaller than TL than when TP is larger than TL and equal to or smaller than TH.

An average of thicknesses of a plurality of electrolytic membranes included in the first fuel cell may be larger than an average of thicknesses of a plurality of electrolytic membranes included in the second fuel cell.

A rated output of the first fuel cell may be larger than a rated output of the second fuel cell.

The control device may be configured to drive the second supply device to scavenge the second fuel cell when water remaining in the second fuel cell can freeze with the electric power generation by the second fuel cell suspended and with driving of the second supply device stopped.

A second aspect of the disclosure relates to a vehicle that comprises the fuel cell unit, the first supply device, the second supply device, and the control device according to the first aspect.

A fuel cell system that restrains the amount of electric power consumption from increasing while ensuring responsiveness to a required output can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

[Configuration of Fuel Cell System]

Figure 1:
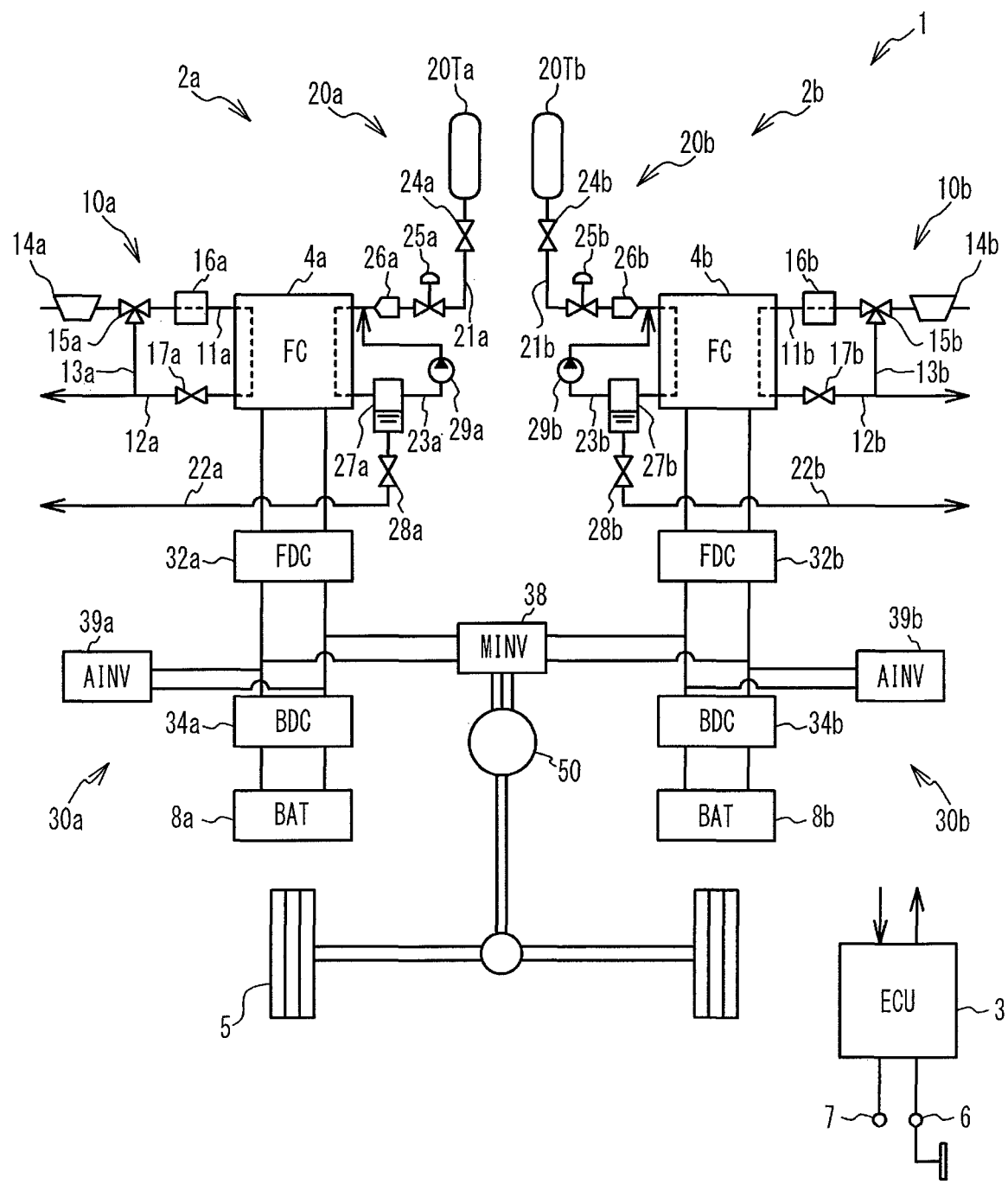
FIG. 1 is a configuration view of a fuel cell system that is mounted in a vehicle.

FIG. 1 is a configuration view of a fuel cell system 1 mounted in a vehicle. The fuel cell system 1 includes two control systems (hereinafter referred to simply as systems) 2a and 2b, and an electronic control unit (an ECU) 3. The systems 2a and 2b include fuel cells (hereinafter referred to as FC's) 4a and 4b, secondary batteries (hereinafter referred to as BAT's) 8a and 8b, cathode gas supply systems 10a and 10b, anode gas supply systems 20a and 20b, and electric power control systems 30a and 30b respectively. Incidentally, the systems 2a and 2b include cooling systems (not shown) that cool the FC's 4a and 4b by circulating coolant therethrough. Besides, the vehicle is equipped with a motor 50 for running, wheels 5, and an accelerator depression amount sensor 6.

Each of the FC's 4a and 4b is a fuel cell that generates electric power upon being supplied with cathode gas and anode gas. Each of the FC's 4a and 4b is obtained by stacking a plurality of solid polyelectrolyte-type single cells on one another. In the first embodiment, the FC's 4a and 4b are identical to each other, and have the same rated output, but the disclosure is not limited thereto. The FC's 4a and 4b are an example of the fuel cell unit, and are also examples of the first fuel cell and the second fuel cell respectively.

The cathode gas supply systems 10a and 10b are examples of the first supply device and the second supply device that supply the air containing oxygen as cathode gas to the FC's 4a and 4b respectively. In concrete terms, the cathode gas supply systems 10a and 10b include supply pipes 11a and 11b, discharge pipes 12a and 12b, bypass pipes 13a and 13b, air compressors 14a and 14b, bypass valves 15a and 15b, intercoolers 16a and 16b, and back pressure valves 17a and 17b, respectively.

The supply pipes 11a and 11b are connected to cathode inlet manifolds of the FC's 4a and 4b respectively. The discharge pipes 12a and 12b are connected to cathode outlet manifolds of the FC's 4a and 4b respectively. The bypass pipe 13a establishes communication between the supply pipe 11a and the discharge pipe 12a. By the same token, the bypass pipe 13b also establishes communication between the supply pipe lib and the discharge pipe 12b. The bypass valve 15a is provided in a connection region between the supply pipe 11a and the bypass pipe 13a. By the same token, the bypass valve 15b is provided in a connection region between the supply pipe 11b and the bypass pipe 13b. The bypass valve 15a changes over the state of communication between the supply pipe 11a and the bypass pipe 13a. By the same token, the bypass valve 15b changes over the state of communication between the supply pipe 11b and the bypass pipe 13b. The air compressor 14a, the bypass valve 15a, and the intercooler 16a are arranged on the supply pipe 11a sequentially from an upstream side thereof. The back pressure valve 17a is arranged on the discharge pipe 12a, upstream of a connection region between the discharge pipe 12a and the bypass pipe 13a. By the same token, the air compressor 14b, the bypass valve 15b, and the intercooler 16b are arranged on the supply pipe 11b sequentially from an upstream side thereof. The back pressure valve 17b is arranged on the discharge pipe 12b, upstream of a connection region between the discharge pipe 12b and the bypass pipe 13b.

The air compressors 14a and 14b supply the air containing oxygen as cathode gas to the FC's 4a and 4b via the supply pipes 11a and 11b respectively. The cathode gas supplied to the FC's 4a and 4b is discharged via the discharge pipes 12a and 12b respectively. The intercoolers 16a and 16b cool the cathode gas supplied to the FC's 4a and 4b respectively. The back pressure valves 17a and 17b adjust back pressures of cathode sides of the FC's 4a and 4b respectively.

The anode gas supply systems 20a and 20b are examples of the first supply device and the second supply device that supply hydrogen gas as anode gas to the FC's 4a and 4b respectively. In concrete terms, the anode gas supply systems 20a and 20b include tanks 20Ta and 20Tb, supply pipes 21a and 21b, discharge pipes 22a and 22b, circulation pipes 23a and 23b, tank valves 24a and 24b, pressure adjusting valves 25a and 25b, injectors (hereinafter referred to as INJ's) 26a and 26b, gas-liquid separators 27a and 27b, drain valves 28a and 28b, and hydrogen circulation pumps (hereinafter referred to as HP's) 29a and 29b, respectively.

The tank 20Ta and an anode inlet manifold of the FC 4a are connected to each other by the supply pipe 21a. By the same token, the tank 20Tb and an anode inlet manifold of the FC 4b are connected to each other by the supply pipe 21b. Hydrogen gas as anode gas is stored in the tanks 20Ta and 20Tb. The discharge pipes 22a and 22b are connected to anode outlet manifolds of the FC's 4a and 4b respectively. The circulation pipes 23a and 23b establish communication between the gas-liquid separators 27a and 27b and the supply pipes 21a and 21b respectively. The tank valve 24a, the pressure adjusting valve 25a, and the INJ 26a are arranged sequentially from an upstream side of the supply pipe 21a. The opening degree of the pressure adjusting valve 25a is adjusted, and the INJ 26a injects anode gas, with the tank valve 24a open. Thus, anode gas is supplied to the FC 4a. The driving of the tank valve 24a, the pressure adjusting valve 25a, and the INJ 26a is controlled by the ECU 3. The same holds true for the tank valve 24b, the pressure adjusting valve 25b, and the INJ 26b.

The gas-liquid separator 27a and the drain valve 28a are arranged in the discharge pipe 22a sequentially from an upstream side thereof. The gas-liquid separator 27a separates water from the anode gas discharged from the FC 4a, and stores the water. The water stored in the gas-liquid separator 27a is discharged to the outside of the fuel cell system 1 via the discharge pipe 22a, through the opening of the drain valve 28a. The driving of the drain valve 28a is controlled by the ECU 3. The same holds true for the gas-liquid separator 27b and the drain valve 28b.

The circulation pipe 23a is a pipeline for recirculating anode gas to the FC 4a. An upstream end portion of the circulation pipe 23a is connected to the circulation pipe 23a. The HP 29a is arranged in the circulation pipe 23a. The anode gas discharged from the FC 4a is appropriately pressurized by the HP 29a, and is introduced to the supply pipe 21a. The driving of the HP 29a is controlled by the ECU 3. The same holds true for the circulation pipe 23b and the HP 29b.

The electric power control systems 30a and 30b include fuel cell DC/DC converters (hereinafter referred to as FDC's) 32a and 32b, battery DC/DC converters (hereinafter referred to as BDC's) 34a and 34b, and auxiliary inverters (hereinafter referred to as AINV's) 39a and 39b, respectively. Besides, the electric power control systems 30a and 30b share a motor inverter (hereinafter referred to as an MINV) 38 connected to the motor 50. Each of the FDC's 32a and 32b adjusts a DC electric power from each of the FC's 4a and 4b, and outputs it to the MINV 38. Each of the BDC's 34a and 34b adjusts a DC electric power from each of the BAT's 8a and 8b, and outputs it to the MINV 38. The electric power generated by each of the FC's 4a and 4b can be stored in each of the BAT's 8a and 8b. The MINV 38 converts the input DC electric power into a three-phase AC electric power, and supplies it to the motor 50. The motor 50 drives the wheels 5 to cause the vehicle to run.

The electric power of the FC 4a and the electric power of the BAT 8a can be supplied to load devices other than the motor 50, via the AINV 39a. By the same token, the electric power of the FC 4b and the electric power of the BAT 8b can be supplied to the load devices via the AINV 39b. It should be noted herein that the load devices include auxiliaries for the FC's 4a and 4b and auxiliaries for the vehicle, in addition to the motor 50. The auxiliaries for the FC's 4a and 4b include the above-mentioned air compressors 14a and 14b, the above-mentioned bypass valves 15a and 15b, the above-mentioned back pressure valves 17a and 17b, the above-mentioned tank valves 24a and 24b, the above-mentioned pressure adjusting valves 25a and 25b, the above-mentioned INJ's 26a and 26b, the above-mentioned drain valves 28a and 28b, and the above-mentioned HP's 29a and 29b, respectively. The auxiliaries for the vehicle include, for example, an air-conditioning device, a lighting device, a hazard lamp, and the like.

The ECU 3 includes a central processing unit (a CPU), a read only memory (a ROM), and a random access memory (a RAM). The accelerator depression amount sensor 6, an ignition switch 7, the air compressors 14a and 14b, the bypass valves 15a and 15b, the back pressure valves 17a and 17b, the tank valves 24a and 24b, the pressure adjusting valves 25a and 25b, the INJ's 26a and 26b, the drain valves 28a and 28b, the FDC's 32a and 32b, and the BDC's 34a and 34b are electrically connected to the ECU 3. The ECU 3 calculates an output P required of the entire FC's 4a and 4b, based on a detection value of the accelerator depression amount sensor 6, driving states of the above-mentioned auxiliaries for the vehicle and the above-mentioned auxiliaries for the FC's 4a and 4b, the electric power stored in the BAT's 8a and 8b, and the like. Besides, the ECU 3 controls the auxiliaries for the FC's 4a and 4b and the like in accordance with the required output P, and controls the total electric power generated by the FC's 4a and 4b. Incidentally, the required output P is an output that is required of the fuel cell unit that is composed of the plurality of the fuel cells, and does not include an output that is required of the components other than the fuel cells, such as the BAT's 8a and 8b and the like.

The ECU 3 changes over control modes for controlling the systems 2a and 2b respectively, in accordance with a magnitude of the required output P. In concrete terms, the system 2a is controlled in an electric power generation mode or a holding mode, and the system 2b is controlled in one of the electric power generation mode, the holding mode, and an electric power saving mode. The magnitude of the required output P is determined by being compared with thresholds L and H determined in advance. A relationship: L<H is established between these thresholds. Incidentally, the system 2b is controlled in a scavenging mode when a scavenging condition for the FC 4b is fulfilled. The running of the FC's 4a and 4b and the operation of the cathode gas supply systems 10a and 10b and the anode gas supply systems 20a and 20b are controlled in accordance with these control modes.

[Electric Power Generation Mode]

When the control mode of the system 2a is changed over to the electric power generation mode, the ECU 3 causes electric power generation by the FC 4a, and controls the cathode gas supply system 10a and the anode gas supply system 20a to adjust the flow rates of anode gas and cathode gas that are supplied to the FC 4a. The generation of electric power by the FC 4a is realized by supplying cathode gas and anode gas to the FC 4a and electrically connecting the FC 4a to the load devices through the use of a switch provided inside the FDC 32a. By the same token, when the control mode of the system 2b is changed over to the electric power generation mode, electric power generation by the FC 4b is caused, and the cathode gas supply system 10b and the anode gas supply system 20b are controlled to adjust the flow rates of anode gas and cathode gas that are supplied to the FC 4b. The generation of electric power by the FC 4b is realized by supplying cathode gas and anode gas to the FC 4b and electrically connecting the FC 4b to the load devices through the use of a switch provided inside the FDC 32b.

Incidentally, although the details will be described later, the flow rates of cathode gas and anode gas that are supplied to the FC's 4a and 4b are adjusted such that a total output of the FC's 4a and 4b becomes equal to the required output P when both the systems 2a and 2b are controlled in the electric power generation mode, and the flow rates of cathode gas and anode gas that are supplied to the FC 4a are adjusted such that the output of the FC 4a becomes equal to the required output P when only the system 2a is controlled in the electric power generation mode.

[Holding Mode]

When the control mode of the system 2a is changed over to the holding mode, the ECU 3 suspends electric power generation by FC 4a, and holds the opening circuit voltage of the FC 4a within a target range. The suspension of electric power generation by the FC 4a is realized by electrically disconnecting the FC 4a from the load devices through the use of a switch provided inside the FDC 32a. Besides, the opening circuit voltage of the FC 4a is held within the target range by adjusting the supply amounts of cathode gas and anode gas that are supplied to the FC 4a. Accordingly, when the system 2a is controlled in the holding mode, electric power generation by the FC 4a is suspended, but the driving of the cathode gas supply system 10a and the anode gas supply system 20a is controlled to continuously or intermittently supply cathode gas and anode gas to the FC 4a. For example, when the system 2a is changed over from the holding mode to the electric power generation mode, cathode gas and anode gas have already been supplied to the FC 4a in the state of being controlled in the holding mode, so electric power generation can be resumed with good responsiveness of the output of the FC 4a. Incidentally, a cathode catalyst may elute when the opening circuit voltage is too high, and the output responsiveness in resuming electric power generation may fall when the opening circuit voltage is too low. Therefore, an upper limit and a lower limit of the target range are determined in consideration of this point.

The opening circuit voltage of the FC 4a is held within the target range as follows. When the control mode of the system 2a is changed over to the holding mode, electric power generation by the FC 4a is suspended, anode gas is stopped from being supplied to the FC 4a once having been sufficiently supplied thereto, and the flow rate of cathode gas that is supplied to the FC 4a is adjusted such that the concentration of oxygen in a cathode electrode of the FC 4a becomes lower than in the case of the electric power generation mode. In this state, the concentration of oxygen in the cathode electrode of the FC 4a gradually falls with time due to so-called cross leak, and the opening circuit voltage of the FC 4a also gradually falls and becomes lower than the lower limit again. Cross leak is a phenomenon of the penetration of hydrogen from an anode electrode side to the cathode electrode side via electrolytic membranes. Thus, hydrogen and oxygen react with each other to produce water on the cathode electrode side, and the concentration of oxygen on the cathode electrode side falls. When the concentration of oxygen in the cathode electrode of the FC 4a falls and the opening circuit voltage of the FC 4a becomes lower than the lower limit of the target range, the flow rate of cathode gas that is supplied to the FC 4a by the cathode gas supply system 10a is increased. Thus, the concentration of oxygen in the cathode electrode of the FC 4a rises, and the opening circuit voltage of the FC 4a rises. When the opening circuit voltage of the FC 4a becomes higher than the upper limit of the target range, the flow rate of cathode gas that is supplied to the FC 4a by the cathode gas supply system 10a is reduced. Thus, the concentration of oxygen in the cathode electrode of the FC 4a is restrained from rising, and the opening circuit voltage of the FC 4a is restrained from rising. As described above, the opening circuit voltage of the FC 4a is held within the target range through the changeover of the flow rate of cathode gas to the FC 4a by the cathode gas supply system 10a. Incidentally, the changeover in the flow rate of cathode gas in the cathode gas supply system 10a is controlled by adjusting the opening degree of the bypass valve 15a, but the disclosure is not limited thereto. The flow rate of cathode gas may be controlled by adjusting at least one of the rotational speed of the air compressor 14a, the opening degree of the bypass valve 15a, and the opening degree of the back pressure valve 17a.

Besides, the flow rate of anode gas is not changed over as often as the flow rate of cathode gas. However, a predetermined amount of anode gas is injected from the injector 26a when the detection value of a hydrogen concentration sensor provided in a path through which anode gas circulates, for example, the circulation pipe 23a or the like becomes lower than a predetermined value, or when the detection value of a pressure sensor provided in the path through which anode gas circulates becomes lower than a predetermined value. Thus, the concentration of hydrogen in the anode electrode is held high. Besides, the electric power for driving the cathode gas supply system 10a and the anode gas supply system 20a in the holding mode is supplied from at least one of the BAT's 8a and 8b. When the system 2b is controlled in the holding mode as well, the opening circuit voltage of the FC 4b is held within the target range according to a method similar to the above-mentioned one. Incidentally, in the case of a configuration in which the FC 4b is electrically connected to the cathode gas supply system 10a and the anode gas supply system 20a via the AINV 39b, when the system 2b is in the electric power generation mode and the system 2a is in the holding mode, the electric power for driving the cathode gas supply system 10a and the anode gas supply system 20a may be supplied from the FC 4b. By the same token, in the case of a configuration in which the FC 4a is electrically connected to the cathode gas supply system 10b and the anode gas supply system 20b via the AINV 39a, when the system 2a is in the electric power generation mode and the system 2b is in the holding mode, the electric power for driving the cathode gas supply system 10b and the anode gas supply system 20b may be supplied from the FC 4a.

[Electric Power Saving Mode]

The control mode of the system 2a is not changed over to the electric power saving mode, but the control mode of the system 2b is changed over to the electric power saving mode. When the control mode of the system 2b is changed over to the electric power saving mode, the ECU 3 suspends electric power generation by the FC 4b, and stops driving the cathode gas supply system 10b and the anode gas supply system 20b. That is, cathode gas and anode gas are stopped from being supplied to the FC 4b. Thus, in the electric power saving mode, the amount of electric power consumed in the holding mode by driving the cathode gas supply system 10b and the anode gas supply system 20b can be made smaller than in the case where the system 2b is controlled in the above-mentioned holding mode. Besides, in the holding mode, anode gas is continuously supplied to the FC 4b in such a manner as to compensate for the consumption of hydrogen by cross leak as described previously. In the electric power saving mode, however, such consumption of hydrogen is suppressed, and hence, the amount of fuel consumption can also be reduced.

[Scavenging Mode]

Although the details will be described later, the ECU 3 changes over the control mode of the system 2b to the scavenging mode when the scavenging condition for the FC 4b is fulfilled. In concrete terms, the ECU 3 drives at least one of the cathode gas supply system 10b and the anode gas supply system 20b in such a manner as to drain remaining water from at least one of a cathode gas flow channel and an anode gas flow channel in the FC 4b, with electric power generation by the FC 4b suspended. For example, when the anode gas flow channel in the FC 4b is scavenged, remaining water is drained from the anode gas flow channel in the FC 4b by driving the HP 29b for a predetermined period and circulating the gas remaining in the circulation pipe 23b and the like to this anode gas flow channel. Besides, remaining water may be drained from the anode gas flow channel in the FC 4b by driving the INJ 26b for a predetermined period instead of the HP 29b. When the cathode gas flow channel in the FC 4b is scavenged, remaining water is drained from the cathode gas flow channel in the FC 4b by driving the air compressor 14b for a predetermined period, for example, with the discharge pipe 12b and the bypass pipe 13b held out of communication with each other, and supplying cathode gas to this cathode gas flow channel.

[Control of Systems 2a and 2b]

Figure 2:
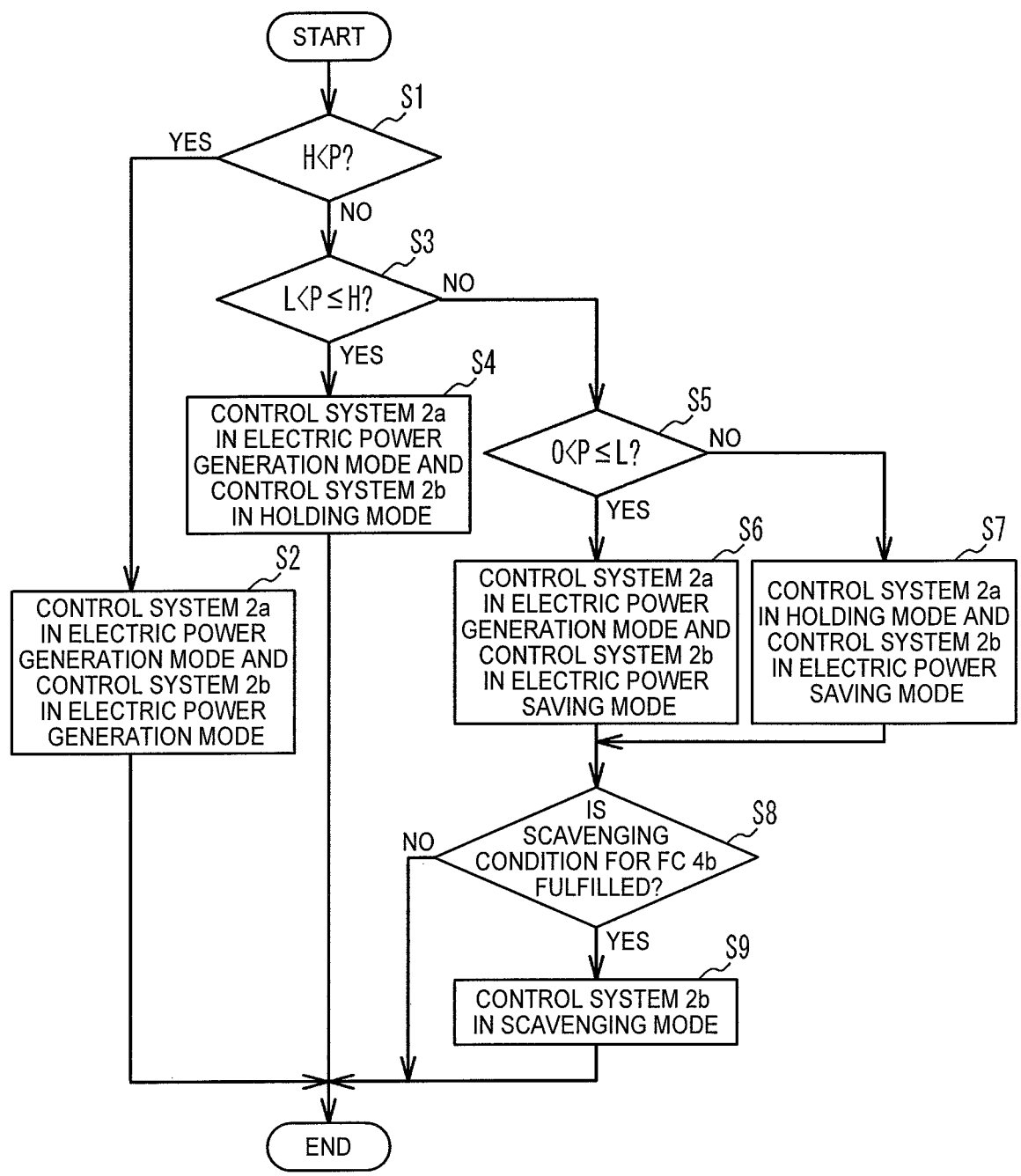
FIG. 2 is a flowchart showing an example of control in the first embodiment.
Figure 3:
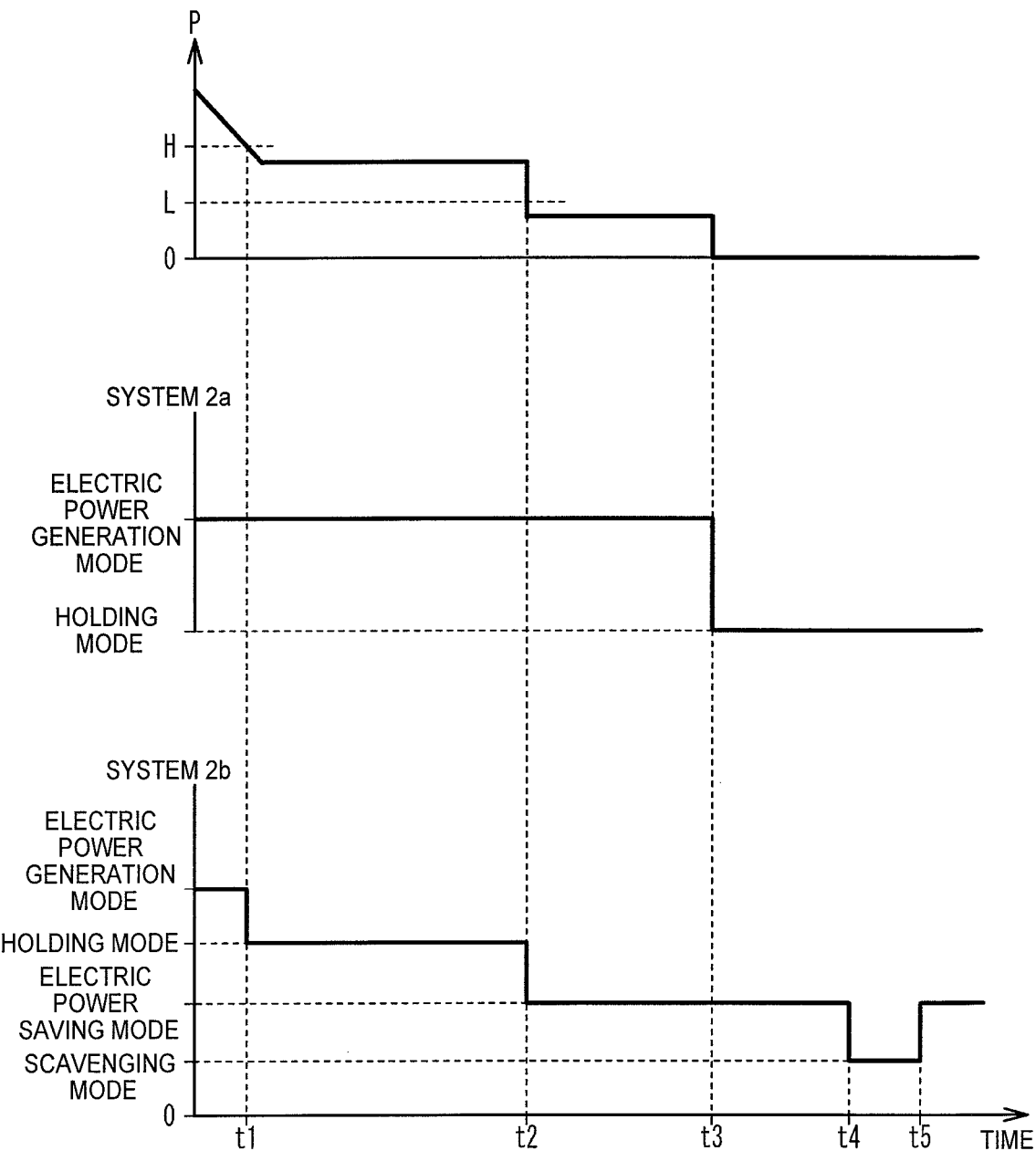
FIG. 3 is a timing chart showing an example of control in the first embodiment.

Next, the control of the systems 2a and 2b that is performed by the ECU 3 will be described. FIG. 2 is a flowchart showing an example of the control in the first embodiment. The control shown in FIG. 2 is repeatedly performed. FIG. 3 is a timing chart showing the example of the control in the first embodiment. FIG. 3 shows how the required output P changes, and how the control modes of the systems 2a and 2b change.

The ECU 3 determines whether or not P is larger than H (step S1). In the first embodiment, the threshold H is set equal to a required output with the vehicle in a running state such as running at a relatively high speed, running uphill, running with heavy luggage carried, or the like.

[System 2a: Electric Power Generation Mode], [System 2b: Electric Power Generation Mode]

If P is larger than H (Yes in step S1), the ECU 3 controls the systems 2a and 2b in the electric power generation mode (step S2). That is, the ECU 3 can cause electric power generation by both the FC's 4a and 4b, and secure the high required output P.

If P is not larger than H (No in step S1), the ECU 3 determines whether or not P is larger than L and equal to or smaller than H (step S3). The threshold L is set equal to a required output with the vehicle in a running state such as running at a relatively low speed, or a required output with the amount of electric power consumed by the auxiliaries for the vehicle relatively large even when the vehicle is stopped. The amount of electric power consumed by the auxiliaries for the vehicle is relatively large, for example, in the case where the vehicle is a private vehicle or a bus and there is a great difference between an outside air temperature and a set temperature of the air-conditioning device, or in the case where the vehicle is a refrigerator vehicle or a freezer vehicle and a refrigeration facility for a container is in operation.

[System 2a: Electric Power Generation Mode], [System 2b: Holding Mode]

If P is larger than L and equal to or smaller than H (Yes in step S3), the ECU 3 controls the system 2a in the electric power generation mode, and controls the system 2b in the holding mode (step S4, at a timing t1). Electric power generation by the FC 4a is continued, so the amount of electric power consumed by the motor 50 for causing the vehicle to run and the auxiliaries for the vehicle can be secured as described above. Besides, the opening circuit voltage is held as it is although electric power generation by the FC 4b is suspended. Therefore, even when the required output P becomes larger than the threshold H due to, for example, a transition of the vehicle from a low-speed running state to a high-speed running state, electric power generation can be resumed with good responsiveness of the output of the FC 4b, and the accelerating performance of the vehicle can be secured.

[System 2a: Electric Power Generation Mode], [System 2b: Electric Power Saving Mode]

If P is not larger than L or not equal to or smaller than H (No in step S3), the ECU 3 determines whether or not P is larger than 0 and equal to or smaller than L (step S5). If P is larger than 0 and equal to or smaller than L (Yes in step S5), the ECU 3 continues to control the system 2a in the electric power generation mode, and controls the system 2b in the electric power saving mode (step S6, at a timing t2). The system 2a remains in the electric power generation mode, so the amount of electric power consumed by the motor 50 for causing the vehicle to run and the auxiliaries for the vehicle can be secured. Besides, the system 2b is in the electric power saving mode, so the amount of electric power consumed to control the system 2b in the holding mode is reduced. Furthermore, the system 2b is controlled in the electric power generation mode when P is larger than H as described above. It is therefore unlikely that the required output P will rapidly increase and become larger than the threshold H from a state where P is larger than 0 and equal to or smaller than L, and that the control mode of the system 2b will be changed over from the electric power saving mode to the electric power generation mode without the intermediary of the holding mode. Therefore, when P is larger than 0 and equal to or smaller than L, the occurrence of problems can be suppressed even in the case where the system 2b is controlled in the electric power saving mode instead of being controlled in the holding mode.

[System 2a: Holding Mode], [System 2b: Electric Power Saving Mode]

If P is not larger than 0 or not equal to or smaller than L (No in step S5), namely, if P is equal to 0, the ECU 3 controls the system 2a in the holding mode, and continues to control the system 2b in the electric power saving mode (step S7, at a timing t3). For example, when P is equal to 0, the remaining amount of the electric power with which the BAT's 8a and 8b are charged is sufficient, the amount of electric power consumed by the auxiliaries for the vehicle is small, and an amount of electric power consumed by the auxiliaries for the vehicle can be sufficiently secured by the electric power with which the BAT's 8a and 8b are charged. For example, when P is equal to 0, the vehicle is stopped, runs in a decelerating manner, runs downhill, etc., the air-conditioning device and the refrigeration facility of the vehicle are stopped, and only the lighting device is lit up. The system 2a is controlled in the holding mode. Therefore, even when the required output P has increased, electric power generation by the FC 4a can be resumed with good output responsiveness. Besides, when P is equal to 0, it is unlikely that the required output P will rapidly increase and become larger than the threshold H. Therefore, the amount of electric power consumed to control the system 2b in the holding mode is reduced, and the amount of fuel consumption is also reduced, by continuing to control the system 2b in the electric power saving mode even in this state.

As described above, when P is equal to or smaller than L, step S6 or step S7 is carried out, and the system 2b is controlled in the electric power saving mode. Therefore, when P has remained equal to or smaller than L for a long time, there is a great effect of reducing the amount of electric power consumed in controlling the system 2b in the holding mode.

Besides, when P is larger than 0 and equal to or smaller than H, step S4 or step S6 is carried out, and the system 2a is controlled in the electric power generation mode, but the system 2b is controlled in the holding mode or the electric power saving mode. Therefore, the cumulative period of electric power generation by the FC 4b is shorter than the cumulative period of electric power generation by the FC 4a, and the aging of the FC 4b is restrained from progressing. Thus, the output performance of the FC 4b can be restrained from deteriorating. For example, in performing the operation of repairing the fuel cell system 1, an operator can efficiently proceed with the operation on the assumption that the output performance of the FC 4a is more likely to have deteriorated than the output performance of the FC 4b.

[System 2b: Scavenging Mode]

After step S6 or step S7, the ECU 3 determines whether or not the scavenging condition for the FC 4b is fulfilled (step S8). The scavenging condition for the FC 4b is fulfilled when the water remaining in the FC 4b can freeze after the start of the control of the system 2b in the electric power saving mode. In concrete terms, the scavenging condition for the FC 4b is fulfilled when the outside air temperature has remained, for example, equal to or lower than a predetermined temperature for a predetermined time since the start of the control of the system 2b in the electric power saving mode. The ECU 3 may estimate the outside air temperature based on, for example, the temperature of coolant for cooling the FC's 4a and 4b, or a detection value of a temperature sensor that detects the outside air temperature may be used as the outside air temperature. The predetermined temperature may be 0° C. at which the water remaining in the FC 4b is likely to freeze, or a temperature that is higher than 0° C. by a predetermined margin in consideration of changes in the outside air temperature, for example, a temperature between 1° C. and 5° C. The predetermined time is, for example, 10 minutes, one hour, three hours, or the like, and is appropriately set in accordance with a putative environment of usage of the vehicle. When the system 2b is controlled in the electric power saving mode under such an environment, cathode gas and anode gas are not supplied to the FC 4b, so the remaining water may freeze in at least one of the cathode gas flow channel and the anode gas flow channel in the FC 4b and may affect the output performance at the time of the resumption of electric power generation by the FC 4b.

Accordingly, if the scavenging condition for the FC 4b is fulfilled (Yes in step S8), the ECU 3 controls the system 2b in the scavenging mode (step S9, at a timing t4). Thus, the remaining water can be restrained from freezing in the FC 4b. The electric power resulting from the establishment of the scavenging mode is supplied from at least one of the BAT's 8a and 8b. The scavenging mode is continuously carried out for a predetermined time, and the scavenging mode is stopped after the lapse of the predetermined time (at a timing t5). If the scavenging condition for the FC 4b is not fulfilled, the ECU 3 ends the present control and carries out the processing steps starting from step S1 again. Incidentally, if the system 2b is controlled to the scavenging mode when P is larger than 0 and equal to or smaller than L, the electric power resulting from the establishment of the scavenging mode may be supplied from the FC 4a of the system 2a that is controlled in the electric power generation mode.

The amount of electric power consumption temporarily increases as a result of the establishment of the scavenging mode. In consideration of the establishment of the electric power saving mode for the system 2b with a view to restraining the amount of electric power consumption from increasing as described above, it is desirable to refrain from establishing this scavenging mode. However, the scavenging mode is established only when the system 2b remains in the electric power saving mode and the outside air temperature has remained equal to or lower than the predetermined temperature for the predetermined time. That is, the scavenging mode is established only on limited occasions. Therefore, even when the scavenging mode is established, the restraint of the increase in the amount of electric power consumption resulting from the establishment of the electric power saving mode exerts a greater effect than the increase in the amount of electric power consumption resulting from the establishment of the scavenging mode.

Incidentally, when the system 2b is controlled in the holding mode, the scavenging mode may not be established. This is because the control mode of the system 2b is likely to be changed over to the electric power generation mode, and the remaining water is unlikely to freeze in the FC 4b when the system 2b is controlled in the holding mode. For the same reason, the scavenging mode is not established when the system 2a is controlled in the holding mode.

Regardless of whether the result of the determination in step S5 is Yes or No, it is determined whether or not there is a demand to scavenge the FC 4b, and the scavenging mode can be established (steps S8 and S9). However, steps S8 and S9 may be carried out only if the result of the determination in step S5 is No, namely, only if the system 2a is controlled in the holding mode and the system 2b is controlled in the electric power saving mode (step S7). That is, as long as the system 2a is in the electric power generation mode, the FC 4b may not be scavenged even when the system 2b is in the electric power saving mode. This is because the remaining water may be restrained from freezing in the FC 4b as long as the FC 4a generates electric power in the case of, for example, a configuration in which the FC's 4a and 4b are arranged so close to each other as to transfer the heat resulting from electric power generation by the FC 4a to the FC 4b, or a configuration in which the coolant that has received the heat resulting from electric power generation by the FC 4a flows through the interior of the FC 4b before passing through a radiator.

The establishment of the scavenging mode during the establishment of the electric power saving mode is not indispensable. For example, P is often considered to be equal to 0 immediately before an ignition is changed over from its on state to its off state. In this case, however, the system 2b may be controlled in the scavenging mode after detecting that the ignition is off.

Second Embodiment

Figure 4:
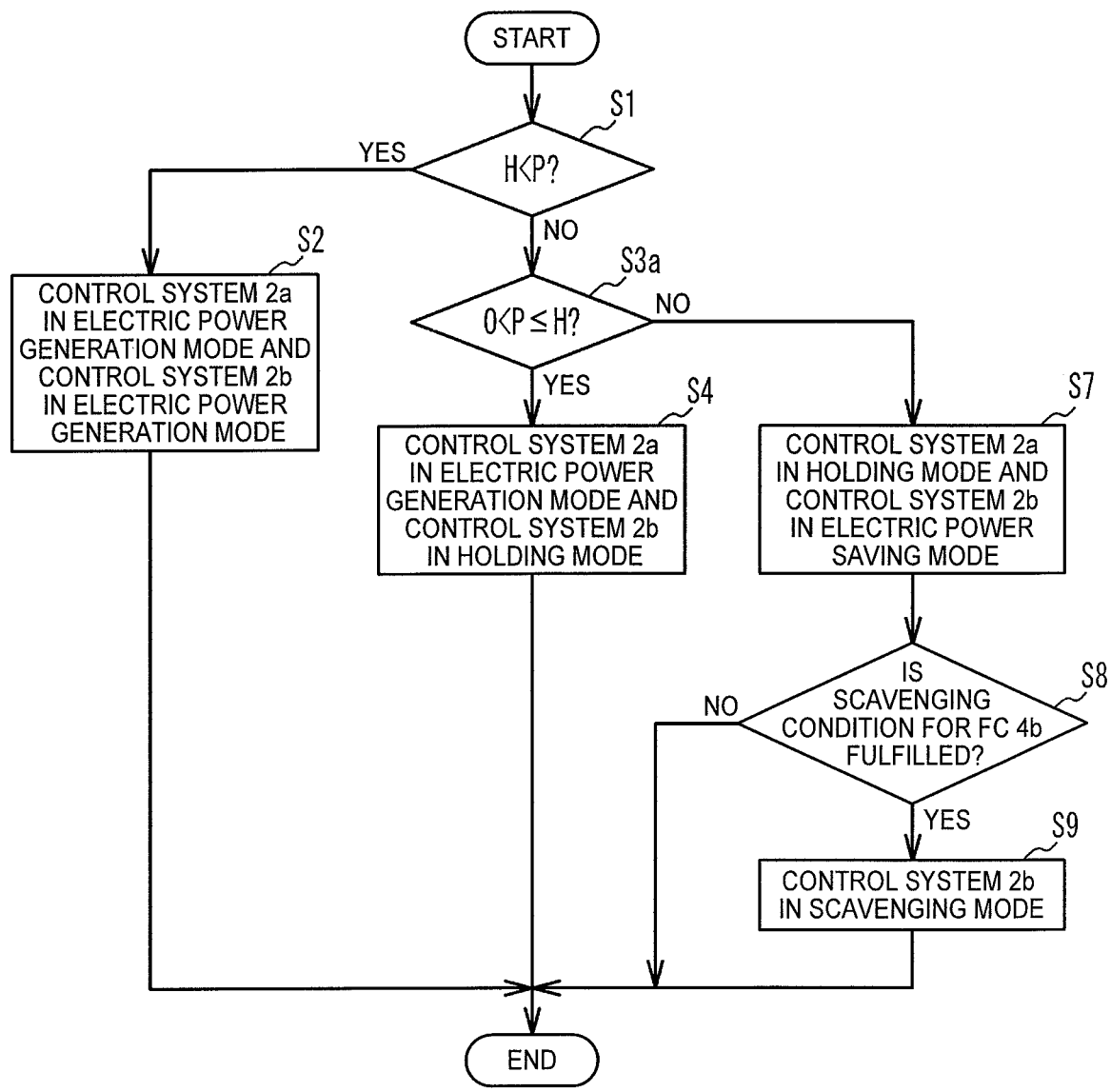
FIG. 4 is a flowchart showing the control of the second embodiment.
Figure 5:
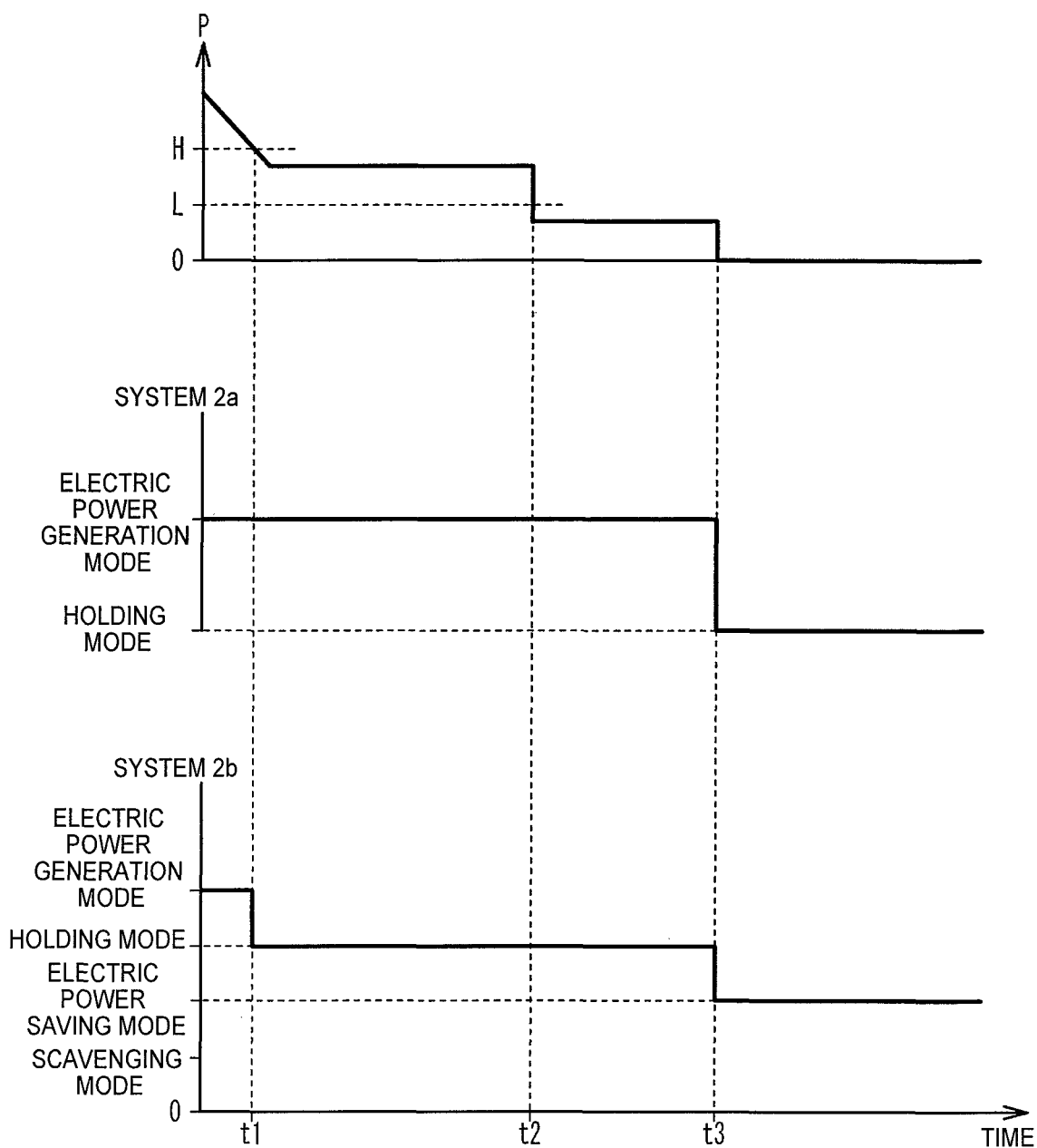
FIG. 5 is a timing chart showing the control of the second embodiment.

FIG. 4 is a flowchart showing the control of the second embodiment. FIG. 5 is a timing chart showing the control of the second embodiment. Incidentally, processing steps that are identical to those in the control of the first embodiment are denoted by the same reference symbols respectively, and redundant description will thereby be omitted. The changes in the required output P shown in FIG. 5 are the same as exemplified in FIG. 3, for the sake of easy understanding. FIG. 5 shows a case where the scavenging mode is not established, unlike FIG. 3.

In the second embodiment, the above-mentioned threshold L is not used, and steps S3, S5, and S6 are not carried out. That is, step S6 is not carried out, so the system 2a is not controlled in the electric power generation mode while the system 2b is controlled in the electric power saving mode. Incidentally, the control of the second embodiment is identical to the control in the case where the threshold L used in the first embodiment is set equal to 0.

In the second embodiment, if P is not larger than H (No in step S1), the ECU 3 determines whether or not P is larger than 0 and equal to or smaller than H (step S3a). If P is larger than 0 and equal to or smaller than H (Yes in step S3a), the ECU 3 controls the system 2a in the electric power generation mode, and controls the system 2b in the holding mode (step S4, at the timing t1). If P is not larger than 0 or not equal to or smaller than H (No in step S3a), namely, if P is, equal to 0, the ECU 3 controls the system 2a in the holding mode, and controls the system 2b in the electric power saving mode (step S7, at the timing t3).

As described above, in the second embodiment, the range of the required output P where the system 2b is controlled in the electric power saving mode is narrower than in the first embodiment, but the range of the required output P where the system 2b is controlled in the holding mode is wider than in the first embodiment. Therefore, electric power generation by the FC 4b can be resumed with good output responsiveness, for example, even when the required output P rapidly increases from a value close to 0 and exceeds the threshold H.

Third Embodiment

Figure 6:
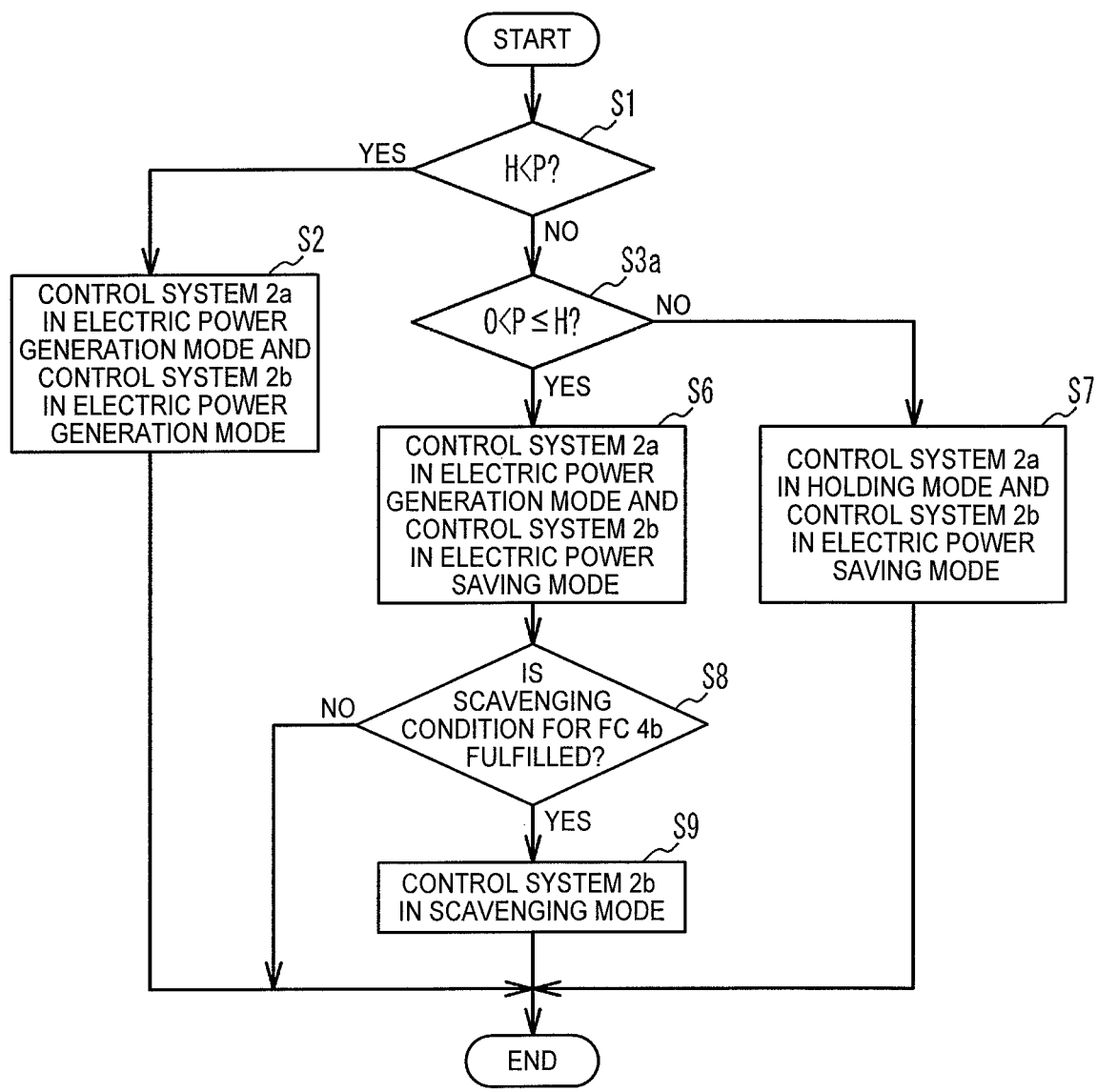
FIG. 6 is a flowchart showing the control of the third embodiment.
Figure 7:
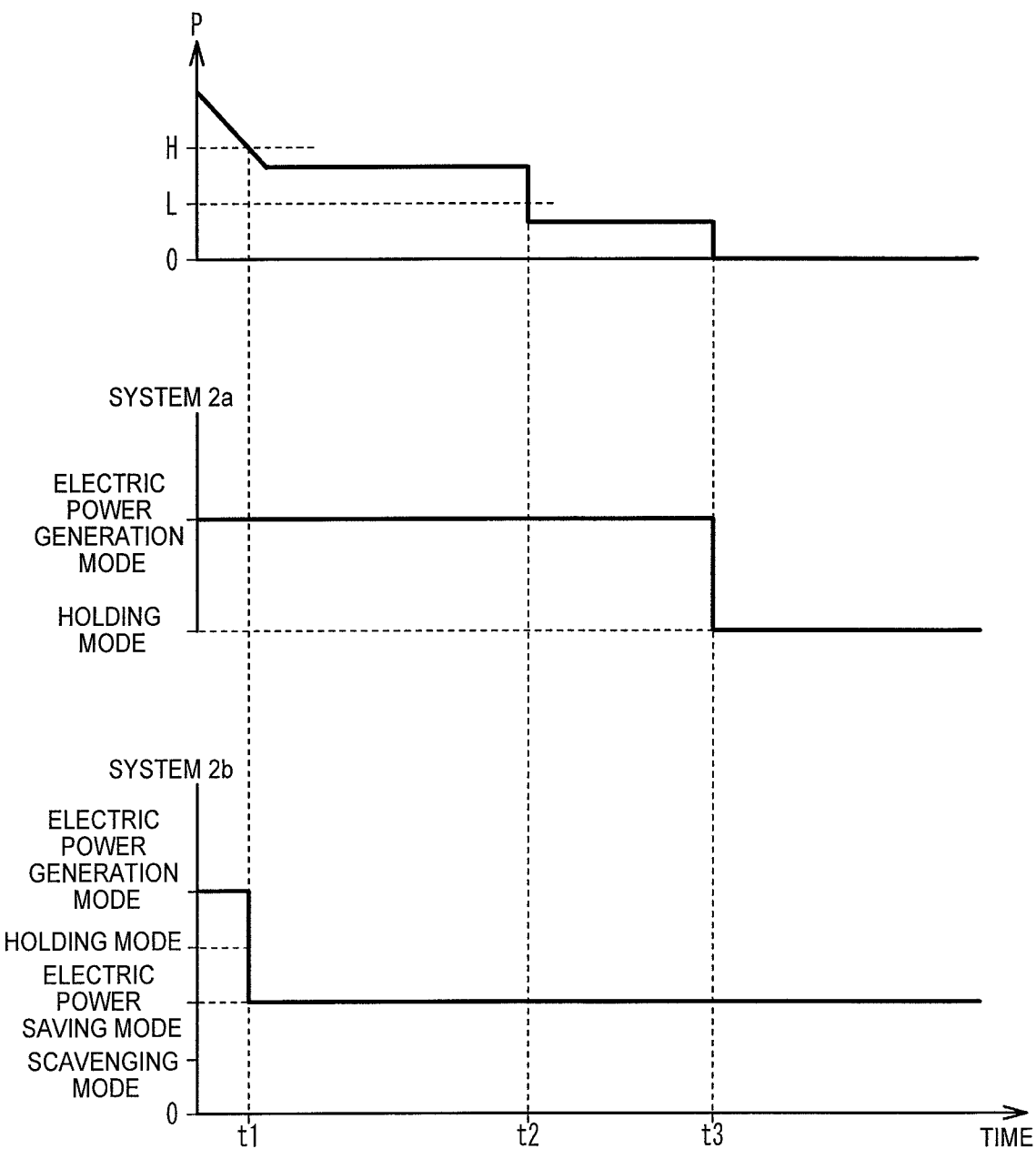
FIG. 7 is a timing chart showing the control of the third embodiment.

FIG. 6 is a flowchart showing the control of the third embodiment. FIG. 7 is a timing chart showing the control of the third embodiment. Incidentally, processing steps that are identical to those in the control of the first embodiment are denoted by the same reference symbols respectively, and redundant description will thereby be omitted. The changes in the required output P shown in FIG. 7 are the same as exemplified in FIG. 3, for the sake of easy understanding. FIG. 7 shows a case where the scavenging mode is not established, unlike FIG. 3.

In the third embodiment, the above-mentioned threshold L is not used, and steps S3, S4, and S5 are not carried out, and step S3a of the second embodiment is carried out. That is, step S4 is not carried out, so the system 2a is not controlled in the electric power generation mode while the system 2b is controlled in the holding mode. The control of the third embodiment is identical to the control in the case where the threshold L used in the first embodiment is set equal to the threshold H.

If P is larger than 0 and equal to or smaller than H (Yes in step S3a), the ECU 3 controls the system 2a in the electric power generation mode, and controls the system 2b in the electric power saving mode (step S6, at the timing t1). As described above, in the third embodiment, the system 2b is not controlled in the holding mode, and is controlled in the electric power saving mode when the system 2b is not controlled in the electric power generation mode. The system 2b is not controlled in the holding mode, so the amount of electric power consumed in the holding mode and the amount of fuel consumed in the holding mode are reduced. Besides, when the system 2b is changed over from the electric power saving mode to the electric power generation mode, it may be impossible to secure the responsiveness of the output of the FC 4b. At this time, however, the system 2a has already been controlled in the electric power generation mode, so the output responsiveness to the required output P can be restrained from falling due to the FC 4a.

Fourth Embodiment

Figure 8:
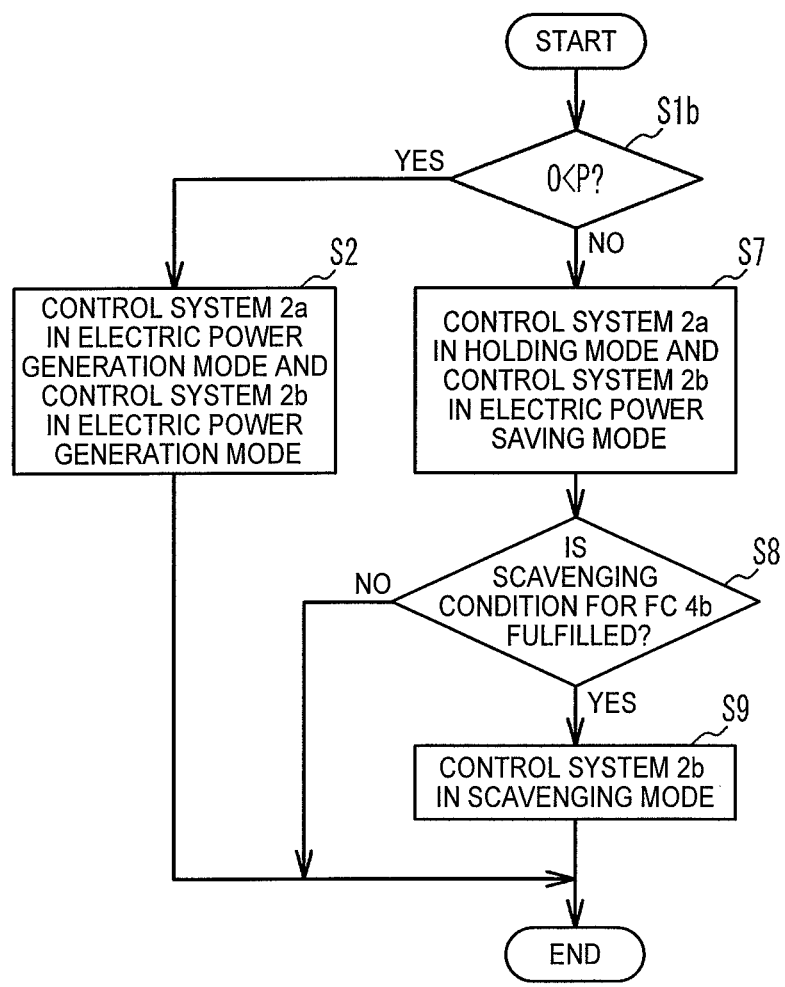
FIG. 8 is a flowchart showing the control of the fourth embodiment.
Figure 9:
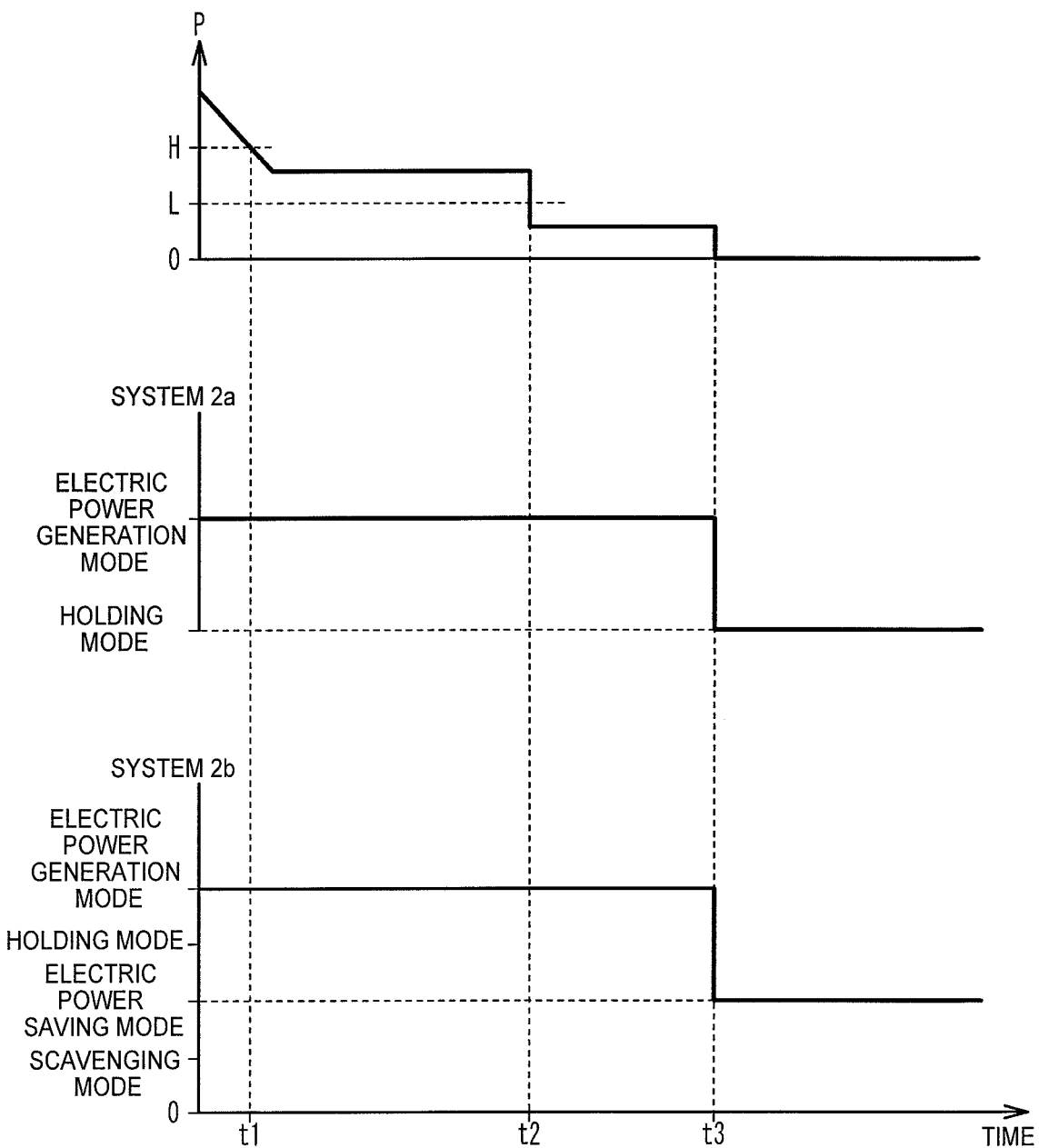
FIG. 9 is a timing chart showing the control of the fourth embodiment.

FIG. 8 is a flowchart showing the control of the fourth embodiment. FIG. 9 is a timing chart showing the control of the fourth embodiment. Incidentally, processing steps that are identical to those in the control of the first embodiment are denoted by the same reference symbols respectively, and redundant description will thereby be omitted. The changes in the required output P shown in FIG. 9 are the same as exemplified in FIG. 3, for the sake of easy understanding. FIG. 9 shows a case where the scavenging mode is not established, unlike FIG. 3.

In the fourth embodiment, the above-mentioned thresholds L and H are not used, and steps S1, S3, S3a, S4, S5, and S6 are not carried out. Steps S4 and S6 are not carried out, so the system 2a is not controlled in the electric power generation mode while the system 2b is controlled in the holding mode or the electric power saving mode.

The ECU 3 determines whether or not P is larger than 0 (step S1b). If P is larger than 0, the ECU 3 controls the systems 2a and 2b in the electric power generation mode (step S2). If P is not larger than 0, namely, if P is equal to 0, the ECU 3 controls the system 2a in the holding mode, and controls the system 2b in the electric power saving mode (step S7, at the timing t3). That is, in the fourth embodiment as well as the third embodiment, the system 2b is not controlled in the holding mode, so the amount of electric power consumed in the holding mode is reduced. Besides, when the required output P increases from 0, the system 2b is changed over from the electric power saving mode to the electric power generation mode, but the system 2a is changed over from the holding mode to the electric power generation mode. Therefore, the FC 4a can resume electric power generation with good responsiveness, and the output responsiveness to the required output P is restrained from being delayed.

Fifth Embodiment

Figure 10:
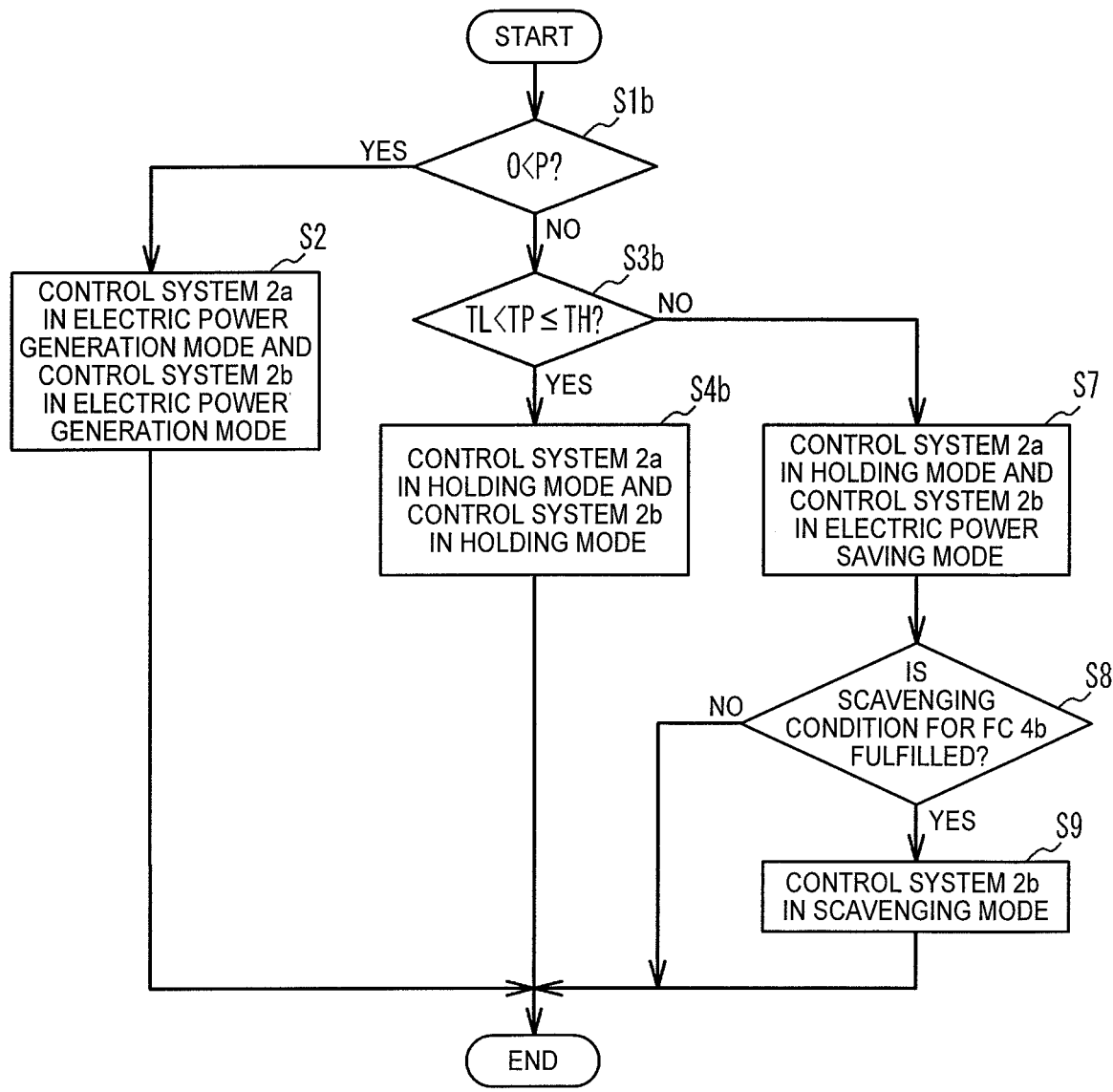
FIG. 10 is a flowchart showing the control of the fifth embodiment.
Figure 11:
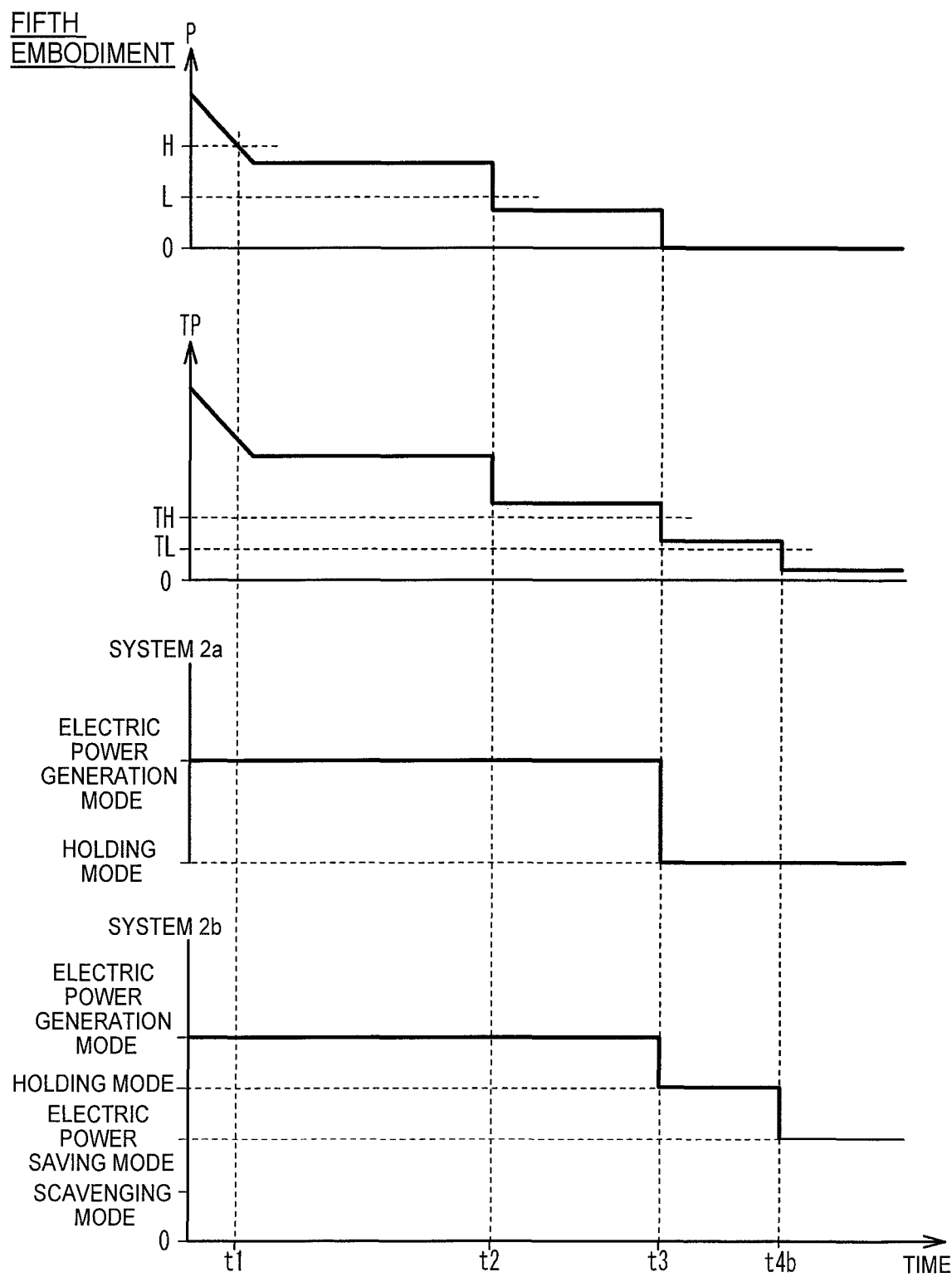
FIG. 11 is a timing chart showing the control of the fifth embodiment.

FIG. 10 is a flowchart showing the control of the fifth embodiment. FIG. 11 is a timing chart showing the control of the fifth embodiment. Incidentally, processing steps that are identical to those in the control of the first embodiment are denoted by the same reference symbols respectively, and redundant description will thereby be omitted. The changes in the required output P shown in FIG. 11 are the same as exemplified in FIG. 3, for the sake of easy understanding. FIG. 11 shows a case where the scavenging mode is not established, unlike FIG. 3.

In the fifth embodiment, the above-mentioned thresholds H and L are not used, and the required output P, a total required output TP, and thresholds TL and TH are used. The total required output TP is an output that is required of the entirety of the FC's 4a and 4b and the BAT's 8a and 8b. It should be noted herein that the required output P is an output that is required of the fuel cell unit that is composed of the plurality of the fuel cells, and does not include an output that is required of the components other than the fuel cells, such as the BAT's 8a and 8b and the like, as described above, but that the total output TP required of the entire fuel cell system is different from the required output P in including the output that is required of the components other than the fuel cells, such as the BAT 8a and the like. The thresholds TL and TH are used to change over the control mode in accordance with the magnitude of the total required output TP, and TH is larger than TL. If TH is equal to or larger than TP, the ECU 3 regards P as equal to 0. If TH is smaller than TP, the ECU 3 regards P as unequal to 0, and calculates the required output P based on the detection value of the accelerator depression amount sensor 6, the electric power stored in the BAT's 8a and 8b, and the like as described above. In the fifth embodiment, the above-mentioned steps S1, S3, S3a, S4, S5, and S6 are not carried out.

The ECU 3 determines whether or not P is larger than 0 (step S1b). If P is larger than 0, the ECU 3 controls the systems 2a and 2b in the electric power generation mode (step S2). If P is not larger than 0, the ECU 3 determines whether or not TP is larger than TL and equal to or smaller than TH (step S3b). The threshold TH is set equal to the total required output TP at which the remaining amount of electric power with which the BAT's 8a and 8b are charged is sufficient, the amount of electric power consumed by the auxiliaries for the vehicle is small, and the amount of electric power consumed by the motor 50 for causing the vehicle to run and the auxiliaries for the vehicle can be sufficiently secured by the electric power with which the BAT's 8a and 8b are charged, as in the aforementioned case where P is equal to 0. For example, in this case, the vehicle is stopped, runs in a decelerating manner, or runs downhill, the refrigerator facility and the like of the vehicle are stopped, and only the air-conditioning device is not driven at an exclusively high load. The threshold TL is set equal to the total required output TP at which the remaining amount of electric power with which the BAT's 8a and 8b are charged is sufficient, the amount of electric power consumed by the auxiliaries for the vehicle is small, the amount of electric power consumed by the motor 50 for causing the vehicle to run and the auxiliaries for the vehicle can be sufficiently secured by the electric power with which the BAT's 8a and 8b are charged. For example, in this case, the vehicle is stopped, runs in a decelerating manner, or runs downhill, many of the auxiliaries for the vehicle are stopped, and only the lighting device of the vehicle is lit up.

If TP is larger than TL and equal to or smaller than TH (Yes in step S3b), the ECU 3 controls both the systems 2a and 2b in the holding mode (step S4b, at the timing t3). Thus, even when the total required output TP rapidly increases, TP becomes larger than TH, and P becomes larger than 0 from a state where TP is larger than TL and equal to or smaller than TH and P is equal to 0, electric power generation by both the FC's 4a and 4b can be resumed with good output responsiveness. Incidentally, if TL is equal to or larger than TP (No in step S3b), only the system 2a is controlled in the holding mode, and the system 2b is controlled in the electric power saving mode as is the case with the first embodiment and the like (step S7, at a timing t4b). Incidentally, in the fifth embodiment, the upper limit and lower limit of the opening circuit voltage of the FC 4a in the case where both the systems 2a and 2b are controlled in the holding mode are equal to the upper limit and lower limit of the opening circuit voltage of the FC 4a in the case where only the system 2a is controlled in the holding mode, respectively.

Sixth Embodiment

Figure 12A:
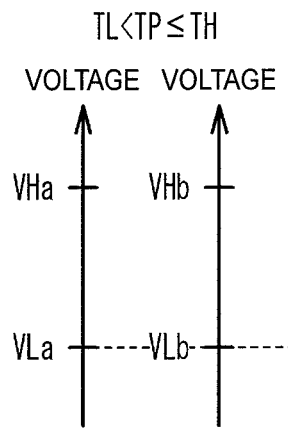
FIG. 12A is an illustrative view of upper limits and lower limits of opening circuit voltages of fuel cells in the sixth embodiment.
Figure 12B:
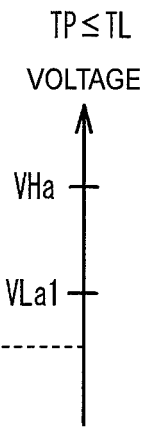
FIG. 12B is an illustrative view of the upper limits and the lower limits of the opening circuit voltages of the fuel cells in the sixth embodiment.

In the sixth embodiment, the control itself that is performed by the ECU 3 is identical to the control of the fifth embodiment as shown in FIGS. 10 and 11. However, the lower limit of the opening circuit voltage of the FC 4a in the case where only the system 2a is controlled in the holding mode is different. FIGS. 12A and 12B are illustrative views of the upper limits and lower limits of the opening circuit voltages of the FC's 4a and 4b in the sixth embodiment. FIG. 12A shows an upper limit VHa and a lower limit VLa of the opening circuit voltage of the FC 4a, and an upper limit VHb and a lower limit VLb of the opening circuit voltage of the FC 4b in the case where TP is larger than TL and equal to or smaller than TH, namely, in the case where both the systems 2a and 2b are controlled in the holding mode. Both the upper limits VHa and VHb are equal to each other. Both the lower limits VLa and VLb are also equal to each other. FIG. 12B shows the upper limit VHa and a lower limit VLa1 of the opening circuit voltage of the FC 4a in the case where TP is equal to or smaller than TL, namely, in the case where only the system 2a is controlled in the holding mode.

The upper limit VHa remains the same regardless of whether both the systems 2a and 2b are controlled in the holding mode or only the system 2a is controlled in the holding mode. However, the lower limit VLa1 is set higher than the lower limit VLa. Accordingly, the opening circuit voltage of the FC 4a in the state where only the system 2a is controlled in the holding mode is held higher than the opening circuit voltage of the FC 4a in the state where both the systems 2a and 2b are controlled in the holding mode. Thus, it is also likely that the total required output TP will rapidly increase from, for example, the state where TP is equal to or smaller than TL, namely, only the system 2a is controlled in the holding mode, TP will become larger than TH, P will become larger than 0, and the system 2a will be changed over to the electric power generation mode. In this case as well, electric power generation by the FC 4a can be resumed with good responsiveness.

Incidentally, both the upper limits VHa and VHb are equal to each other, but the disclosure is not limited thereto. In the sixth embodiment, both the systems 2a and 2b are controlled in the electric power generation mode when P is larger than 0. However, the system 2a may be controlled in the electric power generation mode when P is larger than 0, and the system 2b may be controlled in the electric power generation mode when P is larger than H as indicated in the first embodiment. Also, the system 2b may be controlled in the electric power generation mode when P is larger than L, which is used as the above-mentioned threshold.

Seventh Embodiment

Figure 12C:
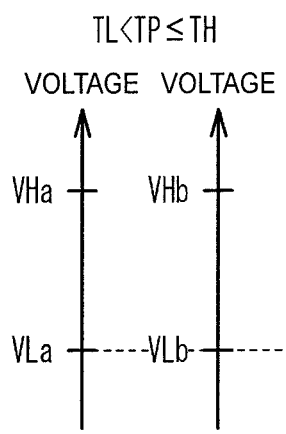
FIG. 12C is an illustrative view of upper limits and lower limits of opening circuit voltages of a fuel cell in the seventh embodiment.
Figure 12D:
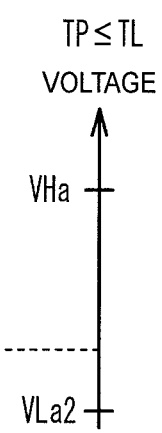
FIG. 12D is an illustrative view of the upper limits and the lower limits of the opening circuit voltages of the fuel cells in the seventh embodiment.

In the seventh embodiment, the control itself that is performed by the ECU 3 is the same as the control of the fifth embodiment as shown in FIGS. 10 and 11. However, the lower limit of the opening circuit voltage of the FC 4a in the case where only the system 2a is controlled in the holding mode is different. FIGS. 12C and 12D are illustrative views of the upper limits and lower limits of the opening circuit voltages of the FC's 4a and 4b in the seventh embodiment.

As shown in FIG. 12C, when TP is larger than TL and equal to or smaller than TH, the opening circuit voltage of the FC 4a is held between the upper limit VHa and the lower limit VLa, and the opening circuit voltage of the FC 4b is held between the upper limit VHb and the lower limit VLb, as is the case with the fifth embodiment. On the other hand, as shown in FIG. 12D, when TP is equal to or smaller than TL, namely, when only the system 2a is controlled in the holding mode, a lower limit VLa2 of the opening circuit voltage of the FC 4a is lower than the lower limit VLa. Thus, the target range of the opening circuit voltage of the FC 4a in the case where only the system 2a is controlled in the holding mode is wider than the target range of the opening circuit voltage of the FC 4a in the case where both the systems 2a and 2b are controlled in the holding mode. Accordingly, the frequency with which the flow rate of cathode gas is changed over, namely, the frequency with which the cathode gas supply system 10a is driven in the case where only the system 2a is controlled in the holding mode can be reduced. Thus, the amount of electric power consumed by controlling the system 2a in the holding mode can be reduced. Incidentally, both the upper limits VHa and VHb are equal to each other, but the disclosure is not limited thereto.

First Modification Example

Figure 13A:
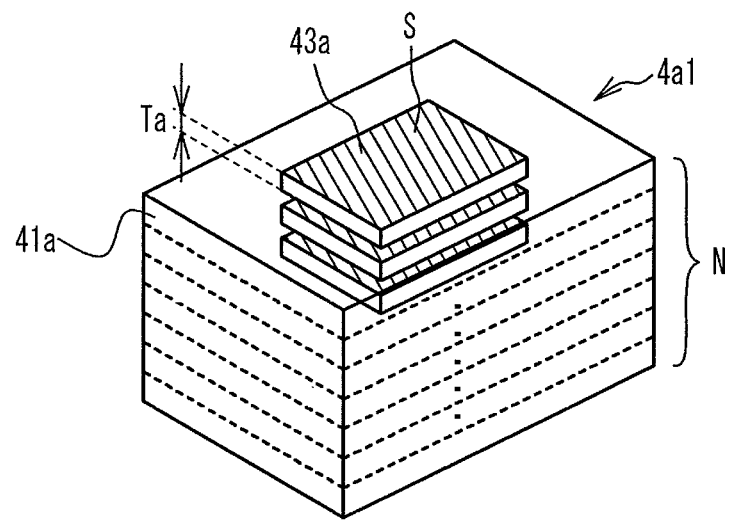
FIG. 13A is an illustrative view of a fuel cell in a first modification example.
Figure 13B:
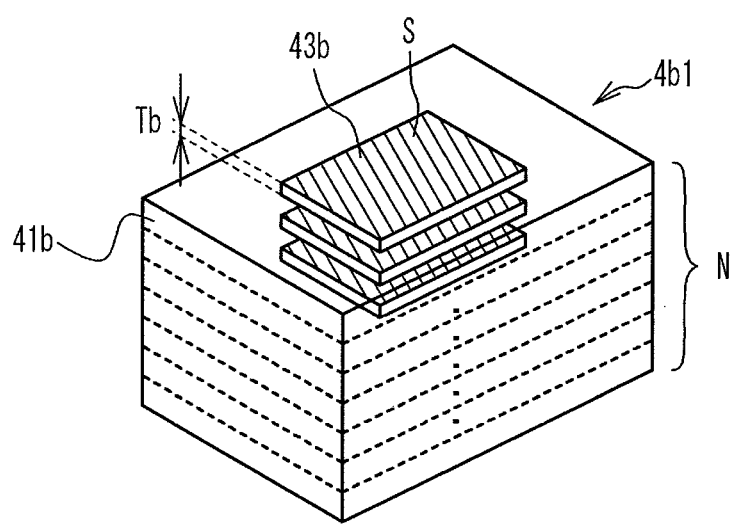
FIG. 13B is an illustrative view of a fuel cell in the first modification example.

Next, modification examples of the FC's that are adopted in the systems 2a and 2b respectively will be described. In the first modification example, the systems 2a and 2b adopt FC's 4a1 and 4b1 instead of the FC's 4a and 4b, respectively. FIGS. 13A and 13B are illustrative views of the FC's 4a1 and 4b1 in the first modification example, respectively. The FC 4a1 is configured by stacking a plurality of single cells 41a on one another. By the same token, the FC 4b1 is configured by stacking a plurality of single cells 41b on one another. Besides, a thickness Ta of each of electrolytic membranes 43a with which the single cells 41a of the FC 4a1 are equipped respectively is greater than a thickness Tb of each of electrolytic membranes 43b with which the single cells 41b of the FC 4b1 are equipped respectively. In addition, each of the electrolytic membranes 43a and each of the electrolytic membranes 43b have the same surface area S. The number N of stacked single cells 41a and the number N of stacked single cells 41b are also equal to each other. The thickness Ta is, for example, about 20 to 50 μm, and the thickness Tb is, for example, about 5 to 15 μm, but the disclosure is not limited thereto.

Figure 14:
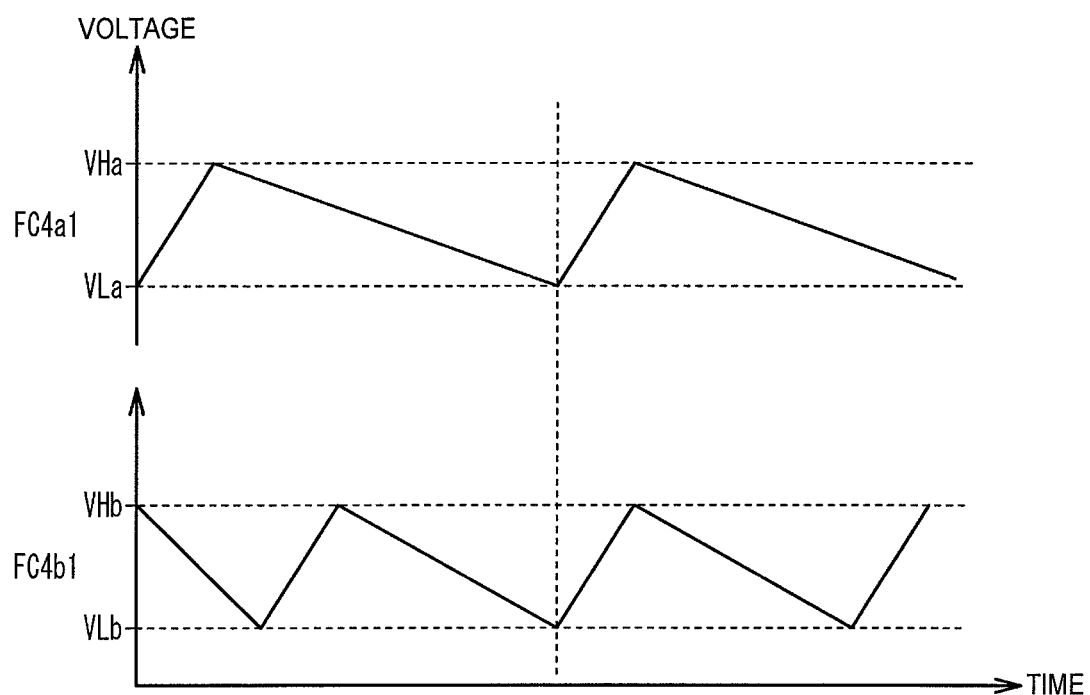
FIG. 14 exemplifies how respective opening circuit voltages of the fuel cells change when the opening circuit voltages are controlled to be held within the same target range under the same condition.

It should be noted herein that the amount of hydrogen penetrating the cathode electrode side from the anode electrode side via the electrolytic membranes per unit time is small and hence the speeds at which the concentration of oxygen and the concentration of hydrogen fall due to cross leak are low when the electrolytic membranes are thick. This effect will now be described. FIG. 14 exemplifies how the opening circuit voltages of the FC's 4a1 and 4b1 change when being controlled to be held within the same target range under the same condition. The speeds at which the concentration of oxygen and the concentration of hydrogen fall due to cross leak are lower in the FC 4a1 than in the FC 4b1. Therefore, the speed at which the opening circuit voltage of the FC 4a1 falls is also lower than the speed at which the opening circuit voltage of the FC 4b1 falls. Accordingly, when the opening circuit voltage of only one of the FC's 4a1 and 4b1 is required to be held within the target range, it is desirable to control, in the holding mode, the system equipped with the FC 4a1 instead of the FC 4b1. Thus, the frequency with which the flow rate of cathode gas that is needed to hold the opening circuit voltage of the FC 4a1 is changed over can be reduced, the amount of electric power consumed by controlling the system equipped with the FC 4a1 in the holding mode can be reduced, and the amount of fuel consumption can also be reduced. In particular, when only the system 2a has been controlled in the holding mode for a long time, there is a great effect of reducing the amount of electric power consumption and the amount of fuel consumption.

In the first modification example, the thicknesses of the plurality of the electrolytic membranes 43a with which the FC 4a1 is equipped may not necessarily be all equal to one another. By the same token, the thicknesses of the plurality of the electrolytic membranes 43b with which the FC 4a2 is equipped may not necessarily be all equal to one another. That is, there is no problem as long as the average of the thicknesses of the plurality of the electrolytic membranes with which the FC 4a1 is equipped is larger than the average of the thicknesses of the plurality of the electrolytic membranes with which the FC 4a2 is equipped. Incidentally, the average of the thicknesses of the electrolytic membranes can be calculated by dividing a total value of the thicknesses of the electrolytic membranes 43a with which the FC 4a1 is equipped by the number of stacked single cells 41a. The same holds true for the FC 4b1.

Second Modification Example

Figure 15A:
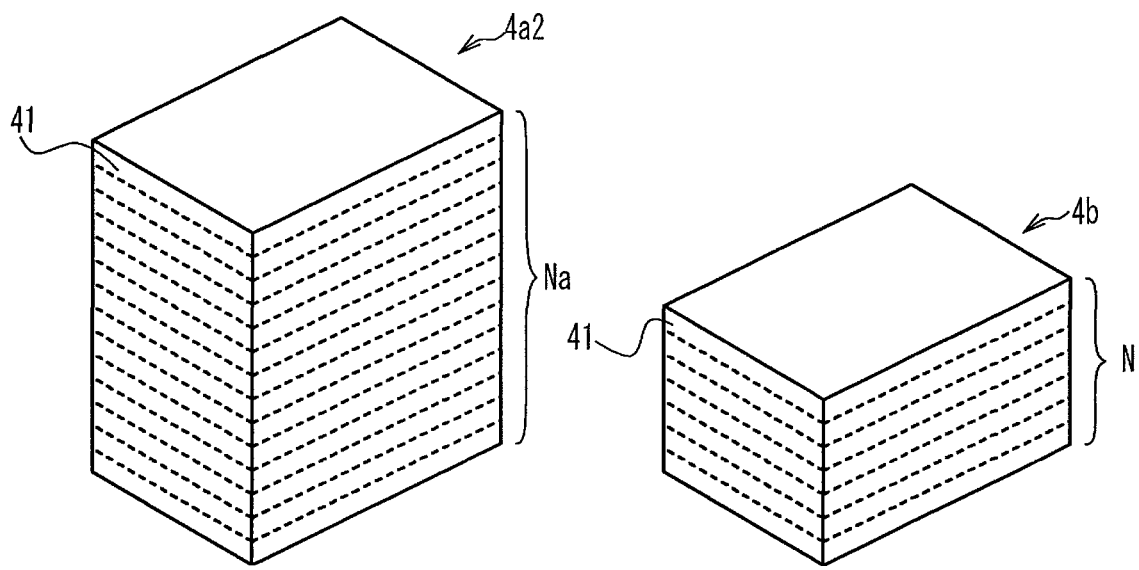
FIG. 15A is an illustrative view of fuel cells in the second modification example.

In the second modification example, the system 2b adopts the above-mentioned FC 4b, and the system 2a adopts an FC 4a2 instead of the FC 4a. FIG. 15A is an illustrative view of the FC's 4a2 and 4b in the second modification example. The FC's 4a2 and 4b are each composed of a plurality of identical single cells 41, but the number Na of stacked single cells 41 in the FC 4a2 is larger than the number N of stacked single cells 41 in the FC 4b. Accordingly, the rated output of the FC 4a2 is larger than the rated output of the FC 4b.

Therefore, when the system 2a is changed over from the holding mode to the electric power generation mode, the responsiveness of the output of the FC 4a2 whose rated output is large can be secured, and electric power generation by the FC 4a2 can be resumed with better output responsiveness. Besides, since the rated output of the FC 4a2 is large, the range of the required output P that can be coped with by the output of only the FC 4a2 can be secured, and the range of the required output P where the system 2a is controlled to the electric power generation mode and the system 2b is controlled to a mode other than the electric power generation mode can be enlarged. Thus, the cumulative period of electric power generation by the FC 4b can be further reduced, and the aging of the FC 4b can be restrained from progressing. Incidentally, the rated output is an electric power that can be continuously output by a fuel cell for a predetermined time. For example, the rated output may be a maximum electric power that can be continuously output for a short time such as 10 seconds or the like, or a maximum electric power that can be continuously output for a long time such as one hour or more or the like.

Third Modification Example

Figure 15B:
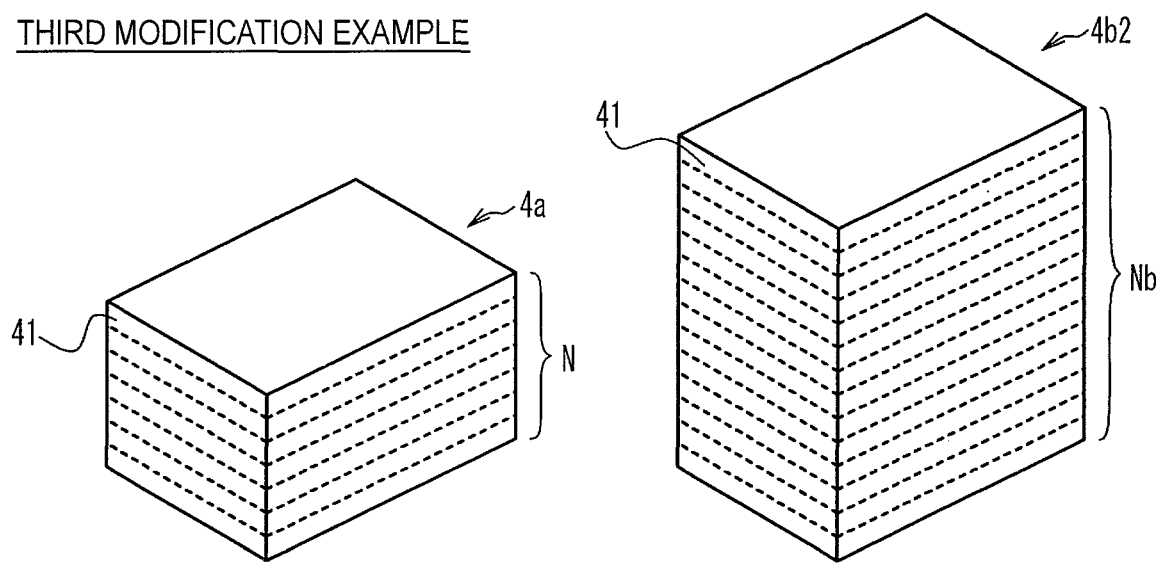
FIG. 15B is an illustrative view of fuel cells in the third modification example.

In the third modification example, the system 2a adopts the above-mentioned FC 4a, and the system 2b adopts an FC 4b2 instead of the FC 4b. FIG. 15B is an illustrative view of the FC's 4a and 4b2 in the third modification example. The FC's 4a and 4b2 are each composed of a plurality of identical single cells 41, but the number Nb of stacked single cells 41 in the FC 4b2 is larger than the number N of stacked single cells 41 in the FC 4a. Thus, the rated output of the FC 4b2 is larger than the rated output of the FC 4a.

It should be noted herein that since the rated output of the FC 4b2 is larger than the rated output of the FC 4a, the amount of reactive gas that is needed to generate electric power at the same cell voltage is larger in the FC 4b2 than in the FC 4a. Accordingly, when electric power is generated at the same cell voltage, the amount of electric power that is consumed to supply reactive gas to the FC 4b2 is larger than the amount of electric power that is consumed to supply reactive gas to the FC 4a. It should be noted herein that the system 2a is not controlled in the electric power saving mode, and that the system 2b can be controlled in the electric power saving mode. Therefore, the above-mentioned effect of reducing the amount of electric power consumption is secured by controlling, in the electric power saving mode, the system 2b equipped with the FC 4b2 in the third modification example.

Besides, the amount of reactive gas that is needed to hold the opening circuit voltage within the same target range for the same period is also larger in the FC 4b2 than in the FC 4a, and the amount of electric power consumed for this purpose is also larger in the FC 4b2 than in the FC 4a. Accordingly, when the system 2b is controlled in the electric power saving mode, there is a great effect of reducing the amount of electric power consumed in the holding mode.

In each of the above-mentioned embodiments and modification examples, the case where the FC 4a is controlled in the electric power generation mode or the holding mode in priority has been described, but the disclosure is not limited thereto. For example, the control mode of the FC 4a and the control mode of the FC 4b may be replaced with each other at intervals of, for example, a predetermined total running time. Thus, the period to a timing when the components need to be replaced can be prolonged by making the degree of deterioration of the FC 4a and the degree of deterioration of the FC 4b equal to each other, and making the degree of deterioration of the auxiliaries for the FC 4a and the degree of deterioration of the auxiliaries for the FC 4b equal to each other.

In each of the above-mentioned embodiments and modification examples, the two FC's 4a and 4b are provided. However, the fuel cell system may be equipped with three or more fuel cells, and supply devices that supply reactive gas to the fuel cells respectively. In each of the above-mentioned embodiments and modification examples, the two BAT's 8a and 8b are provided, but the disclosure is not limited thereto. A single secondary battery that is connected to the FC's 4a and 4b in common may be provided, or three or more secondary batteries may be provided. In each of the aforementioned embodiments, the tanks 20Ta and 20Tb corresponding to the FC's 4a and 4b respectively are provided, but the disclosure is not limited thereto. Instead of the tanks 20Ta and 20Tb, a tank that is shared by the FC's 4a and 4b may be provided, or three or more tanks may be provided.

Each of the above-mentioned embodiments and modification examples adopts the configuration in which anode gas is circulated by the HP's 29a and 29b, but the disclosure is not limited thereto. For example, there may be adopted a configuration in which anode gas is circulated by an ejector instead of at least one of the HP's 29a and 29b. In the case where the ejector is adopted instead of the HP 29b, the anode flow channel in the FC 4b can be scavenged by injecting anode gas from the INJ 26b in the scavenging mode.

The above-mentioned fuel cell system is mounted in a vehicle such as a private vehicle, a bus, a refrigerator vehicle, a freezer vehicle or the like, but the disclosure is not limited thereto. For example, the fuel cell system may be stationary. Besides, the vehicle may not necessarily be an automobile, but may be a two-wheel vehicle, a railroad vehicle, a ship, an airplane or the like. Besides, the vehicle may be a hybrid vehicle that can be driven by a combination of a motor and an internal combustion engine.

Although the preferred embodiments of the disclosure have been described above in detail, the disclosure should not be limited to the specific embodiments thereof, but can be subjected to various modifications and alterations.

What is claimed is:

1. A fuel cell system comprising:
    a fuel cell unit that is composed of a plurality of fuel cells including a first fuel cell and a second fuel cell;
    a first supply device and a second supply device that supply reactive gas to the first fuel cell and the second fuel cell respectively; and
    a control device that is programmed to control running of the first fuel cell and the second fuel cell and operation of the first supply device and the second supply device, wherein
    the control device is programmed to suspend electric power generation by the first fuel cell and drive the first supply device to hold an opening circuit voltage of the first fuel cell within a target range, and suspend electric power generation by the second fuel cell and stop driving the second supply device when an output power P required of the fuel cell unit is equal to 0.

2. The fuel cell system according to claim 1, wherein
    the control device is programmed to cause the electric power generation by the first fuel cell and suspend the electric power generation by the second fuel cell when the required output power P is larger than 0 and equal to or smaller than a threshold value of H that is larger than 0, and cause the electric power generation by the first fuel cell and the second fuel cell when the required output power P is larger than H.

3. The fuel cell system according to claim 1, wherein
    the control device is programmed to cause the electric power generation by the first fuel cell and the second fuel cell when the required output power P is larger than 0.

4. The fuel cell system according to claim 2, wherein
    the control device is programmed to drive the second supply device to hold the opening circuit voltage of the second fuel cell within the target range when the required output power P is larger than a threshold value of L that is equal to or larger than 0 and smaller than H, and equal to or smaller than H.

5. The fuel cell system according to claim 2, wherein
    the control device is programmed to suspend the electric power generation by the second fuel cell and stop driving the second supply device when the required output power P is larger than 0 and equal to or smaller than a threshold value of L that is larger than 0 and equal to or smaller than H.

6. The fuel cell system according to claim 1, further comprising:
    a secondary battery, wherein
    the control device is programmed to regard the required output power P as equal to 0 when a total output TP required of the entire fuel cell system is equal to or smaller than a threshold value of TH, suspend the electric power generation by the first fuel cell and drive the first supply device to hold the opening circuit voltage of the first fuel cell within the target range, and suspend the electric power generation by the second fuel cell and stop driving the second supply device when TP is equal to or smaller than a threshold value of TL that is smaller than the threshold value of TH, and drive the first supply device to hold the opening circuit voltage of the first fuel cell within the target range and drive the second supply device to hold the opening circuit voltage of the second fuel cell within the target range when TP is larger than TL and equal to or smaller than TH.

7. The fuel cell system according to claim 6, wherein a lower limit of the target range of the opening circuit voltage of the first fuel cell is higher when TP is equal to or smaller than TL than when TP is larger than TL and equal to or smaller than TH.

8. The fuel cell system according to claim 6, wherein the target range of the opening circuit voltage of the first fuel cell is wider when TP is equal to or smaller than TL than when TP is larger than TL and equal to or smaller than TH.

9. The fuel cell system according to claim 1, wherein an average of thicknesses of a plurality of electrolytic membranes included in the first fuel cell is larger than an average of thicknesses of a plurality of electrolytic membranes included in the second fuel cell.

10. The fuel cell system according to claim 1, wherein a rated output of the first fuel cell is larger than a rated output of the second fuel cell.

11. The fuel cell system according to claim 1, wherein the control device is programmed to drive the second supply device to scavenge the second fuel cell when water remaining in the second fuel cell can freeze with the electric power generation by the second fuel cell suspended and with driving of the second supply device stopped.

12. A vehicle comprising the fuel cell unit, the first supply device, the second supply device, and the control device of the fuel cell system according to claim 1.

* * * * *